(12) United States Patent
Kawasaki et al.

(10) Patent No.: US 9,188,230 B2
(45) Date of Patent: Nov. 17, 2015

(54) GLAND PACKING

(71) Applicant: NIPPON PILLAR PACKING CO., LTD., Osaka-shi, Osaka (JP)

(72) Inventors: Takashi Kawasaki, Osaka (JP); Hiroki Hayashi, Osaka (JP); Koichi Kataoka, Osaka (JP)

(73) Assignee: NIPPON PILLAR PACKING CO., LTD., Osaka-Shi (JP)

( * ) Notice: Subject to any disclaimer, the term of this patent is extended or adjusted under 35 U.S.C. 154(b) by 0 days.

(21) Appl. No.: 14/556,554

(22) Filed: Dec. 1, 2014

(65) Prior Publication Data

US 2015/0159757 A1 Jun. 11, 2015

(30) Foreign Application Priority Data

Dec. 5, 2013 (JP) ................................. 2013-251775

(51) Int. Cl.
*F16J 15/18* (2006.01)
*F16J 15/22* (2006.01)

(52) U.S. Cl.
CPC ................ *F16J 15/22* (2013.01); *F16J 15/182* (2013.01)

(58) Field of Classification Search
CPC .................................. F16J 15/20; F16J 15/22
See application file for complete search history.

(56) References Cited

U.S. PATENT DOCUMENTS

| | | | | |
|---|---|---|---|---|
| 4,949,620 A | * | 8/1990 | Swan et al. | 87/8 |
| 5,419,568 A | * | 5/1995 | Champlin | 277/529 |
| 2013/0075978 A1 | * | 3/2013 | Azibert et al. | 277/529 |
| 2013/0307229 A1 | * | 11/2013 | Veiga et al. | 277/652 |
| 2014/0084546 A1 | * | 3/2014 | Starbile et al. | 277/308 |

FOREIGN PATENT DOCUMENTS

| | | |
|---|---|---|
| JP | 63-67576 | 12/1988 |
| JP | 5-39871 | 2/1993 |
| JP | 2005-36922 | 2/2005 |

* cited by examiner

*Primary Examiner* — Gilbert Lee
(74) *Attorney, Agent, or Firm* — Rankin, Hill & Clark LLP

(57) ABSTRACT

A gland packing is braided in a state where, in crossing angles of yarns which are exposed on four side surfaces of a string-like member, crossing angles in adjacent side surfaces of the four side surfaces are different from ch other. The string-like member is looped so that the crossing angle on the side surface in the four side surfaces, the side surface being to function as an inner circumferential surface, is larger than the crossing angles on side surfaces which are to function as side circumferential surfaces adjacent to the inner circumferential surface.

16 Claims, 28 Drawing Sheets

Fig. 7

| Time | Leakage from whole circumference | |
|---|---|---|
| | Prior art | Invention |
| 0 | 1490 | 680 |
| 0.17 | 1020 | 590 |
| 0.25 | 790 | 550 |
| 0.5 | 550 | 500 |
| 1 | 420 | 420 |
| 2 | 320 | 270 |
| 3 | 280 | 180 |
| 4 | 280 | 110 |
| 5 | 270 | 85 |
| 6 | 260 | 60 |
| 7 | 255 | 63 |
| 22 | 240 | 62 |
| 23 | 240 | 61 |
| 24 | 240 | 61 |

GLAND PACKING

TECHNICAL FIELD

The present invention relates to a gland packing which is to be used as a sealing component for a fluid apparatus such as a pump or a valve.

BACKGROUND ART

As a gland packing which is used for preventing leakage from a rotation shaft from occurring, a string-like packing in which inorganic fibers such as asbestos fibers or glass fibers are braided by various braiding methods, and then the fibers are impregnated with a lubricant or the like or under-go surface treatment, i.e., a so-called braided packing is often used.

Many kinds of braided packings in which carbon fibers or para-aromatic polyamide fibers are used as a material have been produced. The characteristics of a gland packing, such as the heat resistance, the chemical resistance, and the abrasion resistance have been largely improved. As conventional art examples of this kind, packings disclosed in Patent Literatures 1 and 2 are known.

Among gland packings of this kind, there is a gland packing in which the number of movement paths of yarns (number of yarn paths) is 4, more specifically a grand packing which is configured by a string-like member formed by braiding a plurality of yarns, which has a rectangular section, and in which the directions of the yarns in the section are parallel to diagonal lines, and the number of movement paths of the yarns is set to 4 (see Patent Literature 3).

In such a braided packing, usually, the string-like member is loaded to a gland portion of a pump in the following manner. The string-like member is cut to a predetermined length. Then, the string-like member is inserted in an annular shape (doughnut shape) where its ends are butted together, i.e., as a gland packing. In the insertion, in the side surface which is one of the four side surfaces of the string-like member, and which functions as the inner circumferential surface of the inserted gland packing, the yarns often tend to be flexed and bulged toward the inner center (radially inward side).

The bulge is formed as concaves and convexes on the inner circumferential surface, and adversely affects the flatness of the surface which is contacted with the stem, +with the result that there is a possibility that also the sealing performance against leakage is adversely affected.

PRIOR ART LITERATURE

Patent Literature

[Patent Literature 1]: Japanese Patent Application Laid-Open No. 2005-036922
[Patent Literature 2]: Japanese Patent Application Laid-Open No. 05-039871
[Patent Literature 3]: Japanese Patent Publication No. 63-067576

SUMMARY OF THE INVENTION

Problems to be Solved by the Invention

It is an object of the invention to further improve a gland packing which is configured by a string-like member formed by braiding a plurality of yarns, which has a rectangular section, and in which the directions of the yarns in the section are parallel to diagonal lines, and the number of movement paths of the yarns is set to 4, to enhance the sealing property with less leakage.

Means for Solving the Problems

The first invention provides a gland packing which is configured by a string-like member 2 formed by braiding a plurality of yarns 1, which has a rectangular section, and in which directions of the yarns 1 in the section are parallel to diagonal lines, and the number of movement paths of the yarns is set to 4, and characterized in that the yarns 1 are braided in a state where, in crossing angles $\alpha$ of the yarns 1 which are exposed on four side surfaces $2a$ to $2d$ of the string-like member 2, the crossing angles in adjacent side surfaces of the four side surfaces $2a$ to $2d$ are different from each other.

The second invention is characterized in that, in the gland packing of the first invention, the string-like member 2 is looped so that the crossing angle $\alpha$ in a side surface $2c$ in the four side surfaces $2a$ to $2d$, the side surface being to function as an inner circumferential surface, is larger than the crossing angles $\alpha$ in side surfaces $2b$, $2d$ which are to function as side circumferential surfaces adjacent to the inner circumferential surface.

The third invention is characterized in that, in the gland packing of the first or second invention, in each pair of opposed side surfaces in the four side surfaces $2a$ to $2d$, the crossing angles $\alpha$ of the yarns 1 are set to be equal to each other.

The fourth invention is characterized in that, in the gland packing of any one of the first to third inventions, in edge portions 13 formed by adjacent side surfaces of the string-like member 2, yarns 1 which are continuous from one side surface $2c$ of the adjacent side surfaces to another side surface $2d$ are placed.

The fifth invention is characterized in that, in the gland packing of any one of the first to fourth inventions, the yarns 1 are impregnated with a lubricant.

Effects of the Invention

According to the first invention, the following effects are achieved. In a side surface of the string-like member, when the crossing angle of the yarns is large, the exposed yarn lengths are short, and, when the crossing angle of the yarns is small, the exposed yarn lengths are large (see FIGS. 3A and 3B). In the case where the string-like member is to be looped and formed as a gland packing, when the string-like member is looped so that the side surface where the crossing angle is large is the inner circumferential surface, therefore, a bulge caused by flexure which is produced by looping the string-like member, and which is directed in the inner circumferential surface toward the radially inner side can be made negligibly small.

In the case where the packing is loaded to a gland portion of a pump, therefore, the flatness of the inner circumferential surface which is the surface to be contacted with the stem is improved as compared with the prior art, and the sealing performance can be enhanced. In other words, the further improvement can enhance the sealing property to one with less leakage.

According to the second invention, the packing is configured so that the crossing angle in the side surface which is to function as the inner circumferential surface is larger than the crossing angles in the side surfaces which are to function as the side circumferential surfaces adjacent to the inner circumferential surface. Therefore, the invention has an advantage that the effect of the first invention is surely exerted.

The side circumferential surfaces of the gland packing are formed by the side surfaces in which the crossing angle is small in the string-like member. In the side circumferential surfaces, therefore, the exposed yarn lengths are long, and, in the case where the string-like member is to be looped and formed as a gland packing, bulges which form relatively clear concaves and convexes are produced by flexure that is on the side circumferential surfaces, and that is directed toward the radially inward side. The concave and convex bulges engage with side circumferential surfaces of adjacent gland packings, and also an effect that a mutual rotation preventing function is produced can be exerted.

According to the third invention, in the case where the string-like member is looped and formed as a gland packing, it is possible that, in the inner and outer circumferential surfaces, the crossing angles are increased, and the exposed yarn lengths are shortened, and, in both the side circumferential surfaces, the crossing angles is decreased, and the exposed yarn lengths are prolonged. Therefore, the invention has an advantage that a mutual rotation preventing function with respect to an adjacent gland packing, a packing gland, or the like is surely exerted in the all side circumferential surfaces.

According to the fourth invention, continuous yarns are placed in edge portions, and therefore effects that the edge portions are protected, and that the yarns are prevented from loosening are achieved. In the case where the gland packing is used as a sealing device in a gland portion of a pump, for example, the string-like member is looped and then inserted as an annular gland packing. The invention has a further advantage that, in this case, deformation due to flexure of an edge portion is prevented from occurring.

According to the fifth invention, the yarns are impregnated with a lubricant, and therefore friction with respect to the stem is further reduced, so that a positive influence can be made on the sealing performance.

BRIEF DESCRIPTION OF THE DRAWINGS

FIG. 3A shows packings of the prior art, and FIG. 3B shows packings of the invention.

FIG. 7 is a table showing results of leakage tests performed on gland packings of the prior art and the invention.

FIG. 8A shows packings of the prior art, and FIG. 8B shows packings of the invention.

FIG. 9A shows a first position, and FIG. 9B shows a second position.

FIG. 10A shows a third position, and FIG. 10B shows a fourth position.

FIG. 11A shows a fifth position, and FIG. 11B shows a sixth position.

FIG. 12A shows a seventh position, and FIG. 12B shows an eighth position.

FIG. 13A shows a ninth position, and FIG. 13B shows a tenth position.

FIG. 14A shows an eleventh position, and FIG. 14B shows a twelfth position.

FIG. 15A shows a thirteenth position, and FIG. 15B shows a fourteenth position.

FIG. 16A shows a fifteenth position, and FIG. 16B shows a sixteenth position.

FIG. 17A shows a seventeenth position, and FIG. 17B shows an eighteenth position.

FIG. 18A shows a nineteenth position, and FIG. 18B shows a twentieth position.

FIG. 19A shows a first position, and FIG. 19B shows a second position.

FIG. 20A shows a third position, and FIG. 20B shows a fourth position.

FIG. 21A shows a fifth position, and FIG. 21B shows a sixth position.

FIG. 22A shows a seventh position, and FIG. 223 shows an eighth position.

FIG. 23A shows a ninth position, and FIG. 23B shows a tenth position.

FIG. 24A shows an eleventh position, and FIG. 24B shows a twelfth position.

FIG. 25A shows a thirteenth position, and FIG. 25B shows a fourteenth position.

FIG. 26A shows a fifteenth position, and FIG. 26B shows a sixteenth position.

FIG. 27A shows a seventeenth position, and FIG. 27B shows an eighteenth position.

FIG. 28A shows a nineteenth position, and FIG. 28B shows a twentieth position.

DESCRIPTION OF PREFERRED EMBODIMENTS

Hereinafter, an embodiment of the gland packing of the invention will be described with reference to the drawings. In the specification, for the sake of convenience, a string-like member 2 which is looped and formed into an annular shape is defined as a gland packing G.

[Embodiment 1]

As shown in FIGS. 1 to 3B, the gland packing G of the invention is configured by a string-like member 2 in which a plurality of yarns 1 are braided, and has a rectangular section. In the gland packing, the directions of the yarns 1 in the section are parallel to the diagonal lines, and the number of the movement paths of the yarns 1 is set to 4. The yarns 1 are braided so that, in crossing angles α of the yarns 1 which are exposed on side surfaces 2a to 2d of the string-like member 2, crossing angles in adjacent ones of the side surfaces are set to angles (a≠b) which are different from each other, respectively.

Figure 1:
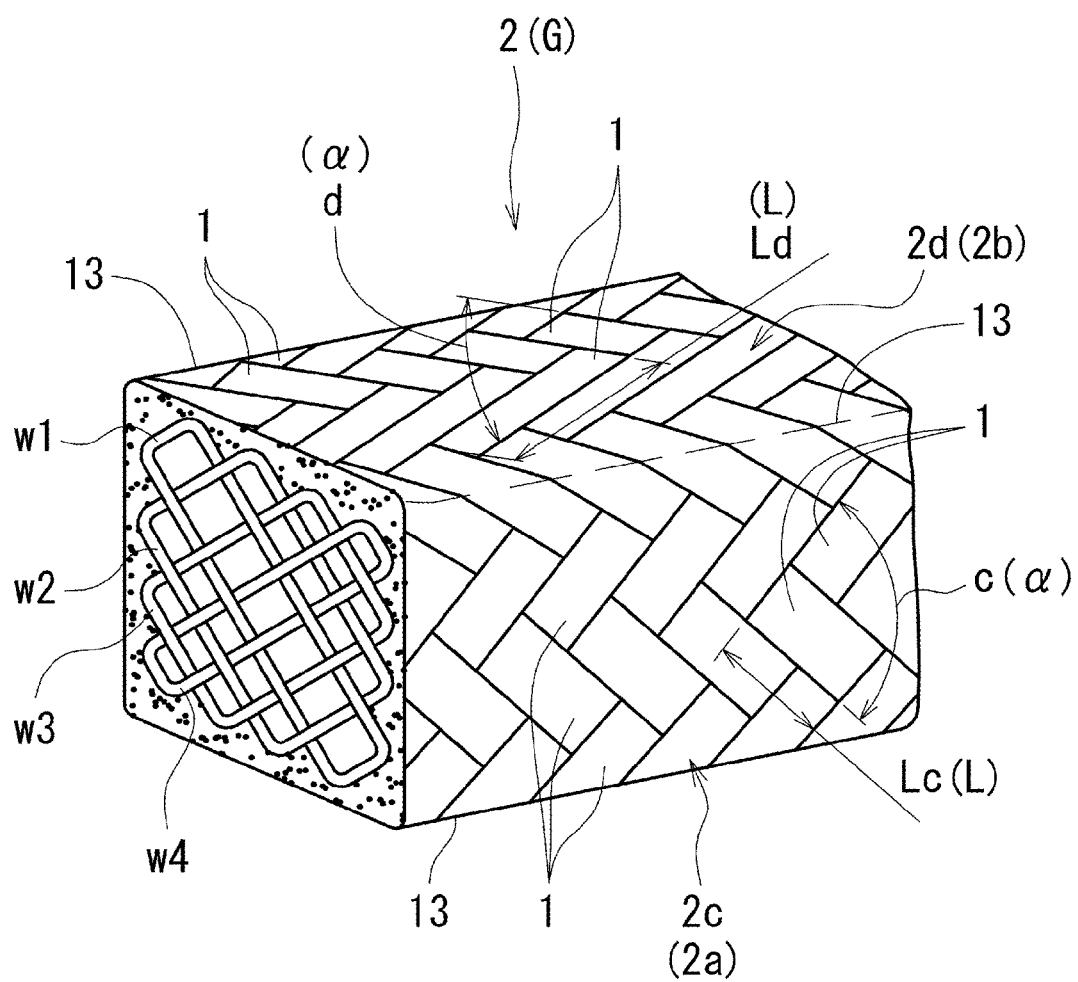
FIG. 1 is a perspective view of a gland packing including a cut-away section (Embodiment 1).

FIG. 1 shows the structure and section of the gland packing G (string-like member 2) of this kind. On four yarn paths w1 to w4 (see FIGS. 5 and 6) which are set so as to extend in parallel along the diagonal lines of a square shape, and cross one another, a plurality of yarns 1 on the respective paths are braided while being sequentially moved so as to alternately and overlappingly cross the other yarns 1 on the other paths, thereby obtaining the string-like member 2 having a square section.

Examples of the yarns 1 are yarns in which acrylic fibers, preferably, fibers of acrylonitrile-vinyl acetate copolymer are twisted. The yarns are not limited to this. The yarns 1 may be impregnated with a solid lubricant such as PTFE or a liquid lubricant.

Figure 5:
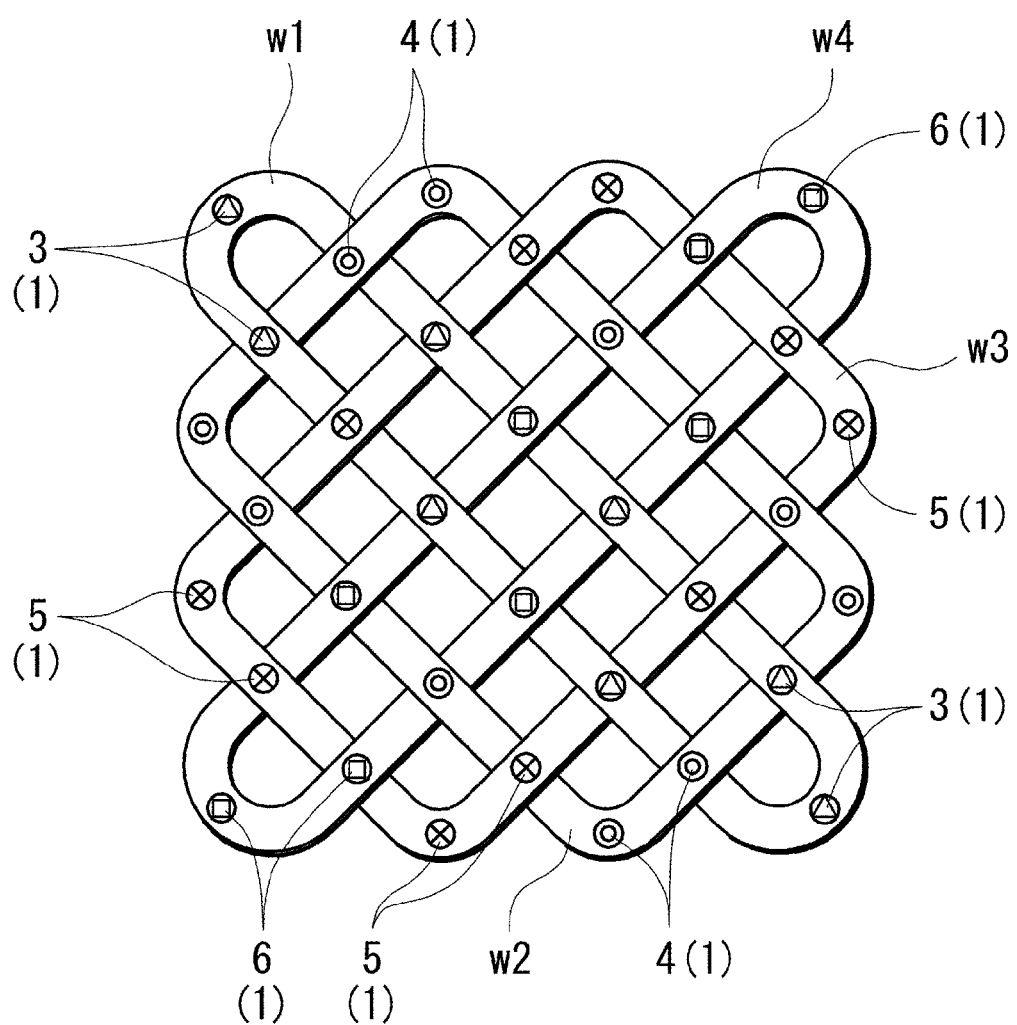
FIG. 5 is a model diagram of yarn paths.

The string-like member 2 functioning as the gland packing G has a string-like shape which is obtained by braiding 36 yarns 1 having a small diameter so as to alternately and overlappingly cross one another, while sequentially moving in the respective directions of the arrows on the four movement paths w1 to w4 that are shown in a modeling manner in FIG. 5. The string-like member has a square sectional shape. Each of the yarns 1 is configured by bundling fibers such as synthetic fibers.

The string-like member 2 is produced by using a braiding machine (not shown) in which 36 yarn bobbins (bobbins around which the yarns 1 are wound) 3 to 6 are sequentially moved on a plurality of predetermined paths that are set so as to form the movement paths w1 to w4 shown in FIG. 5, via a plurality of ratchet wheels (not shown) or the like.

In the braiding machine, as shown in FIG. 5, sets each having 8 yarns 1, i.e., 8 first yarn bobbins 3 and 8 fourth yarn bobbins 6 are moved on the movement paths w1 and w4 which are located on the diagonal lines, respectively, and other sets each having 10 yarns 1, i.e., 10 second yarn bobbins 4 and 10 third yarn bobbins 5 are moved on the other movement paths w2, w3. Namely, the number of the movement paths w1 to w4 of the yarns 1 is 4, and, in the thus brained string-like member 2, the number of the yarns 1 is 36.

Figure 6:
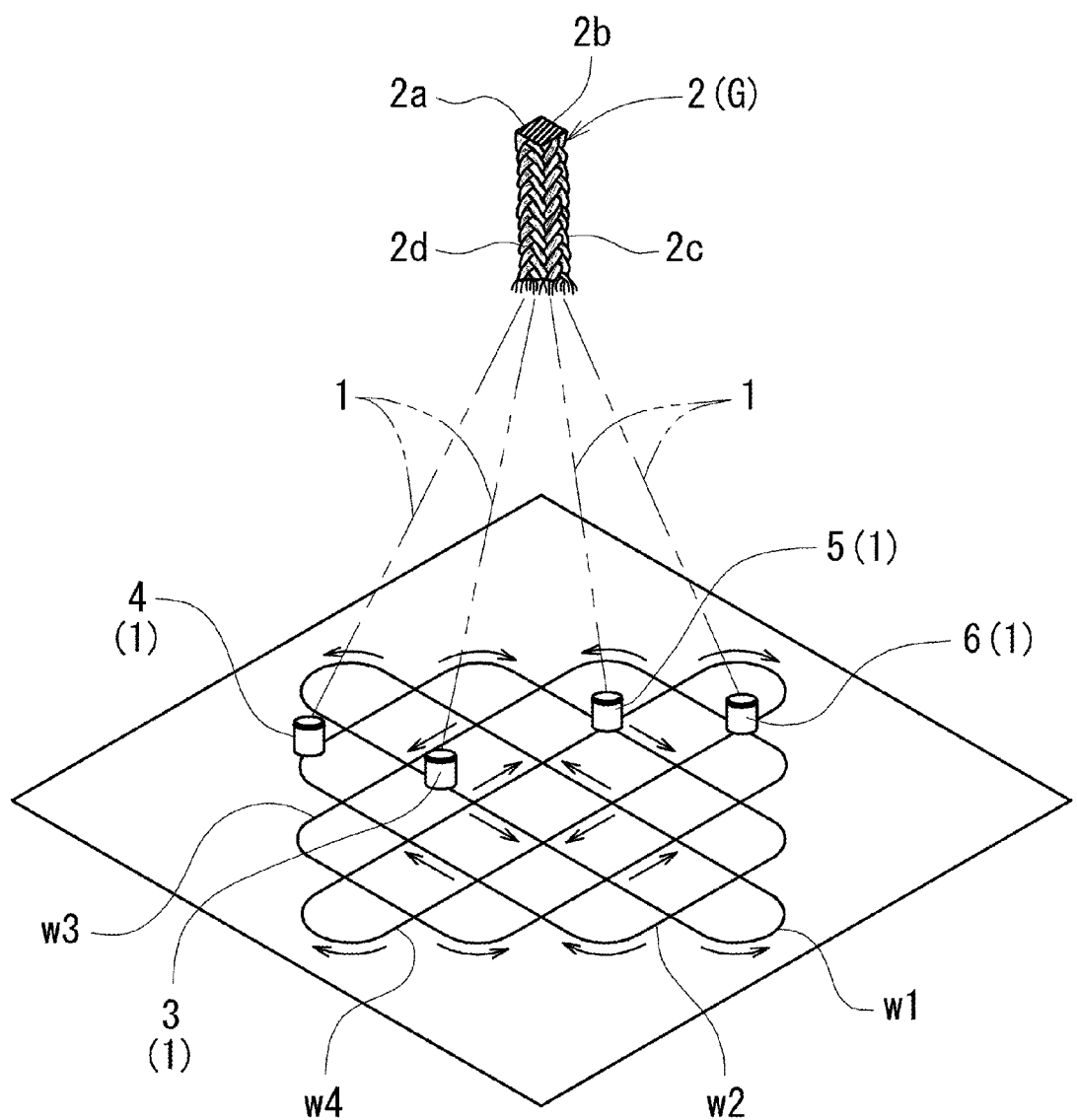
FIG. 6 is a perspective view schematically showing a braided state.

The braiding machine is configured so that, as shown in FIG. 6, the 8 first yarn bobbins 3, the second and third yarn bobbins 4, 5 each consisting of 10 bobbins, and the 8 fourth yarn bobbins 6 (in FIG. 3, only one bobbin is shown for each of the bobbin sets) are moved along the four movement paths w1 to w4 shown in FIG. 5, respectively.

Figure 3A:
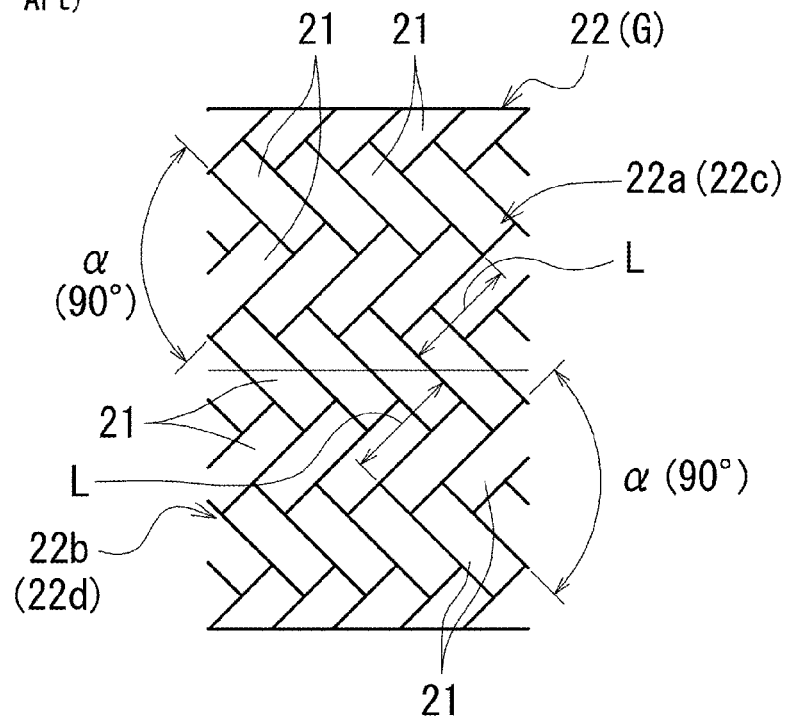
FIGS. 3A and 3B are development views of side surfaces of adjacent packings.

In a string-like member 22 of the prior art, as shown in FIG. 3A, all the crossing angles α of yarns 21 which are exposed on the side surfaces are equal to one another in the four side surfaces 22a to 22d. In the adjacent side surfaces, therefore, also the crossing angles (α) are equal to each other, and the exposed yarn lengths L are equal to each other. Usually, the crossing angles α of the yarns 21 in the side surfaces 22a to 22d are often set to 90 deg.

In the four side surfaces 22a to 22d, two opposed side surfaces (the first side surface 22a and the third side surface 22c, the second side surface 22b and the fourth side surface 22d) have the same pattern (shape), and two adjacent side surfaces (for example, the first side surface 22a and the second side surface 22b) have different patterns (shapes).

In the case where the above-described string-like member 22 is loaded to a gland portion of a pump, usually, the string-like member 22 is cut to a predetermined length, then formed into an annular shape (doughnut shape) where its ends are butted together, i.e., as a gland packing G, and thereafter inserted into the portion. In the insertion, in the side surface (for example, the second side surface 22b) which is one of the four side surfaces 22a to 22d, and which functions as the inner circumferential surface often tends to be flexed and bulged toward the inner center. Conventionally, the bulge is formed as concaves and convexes on the inner circumferential surface, and there is a possibility that the sealing performance is adversely affected.

Figure 2A:
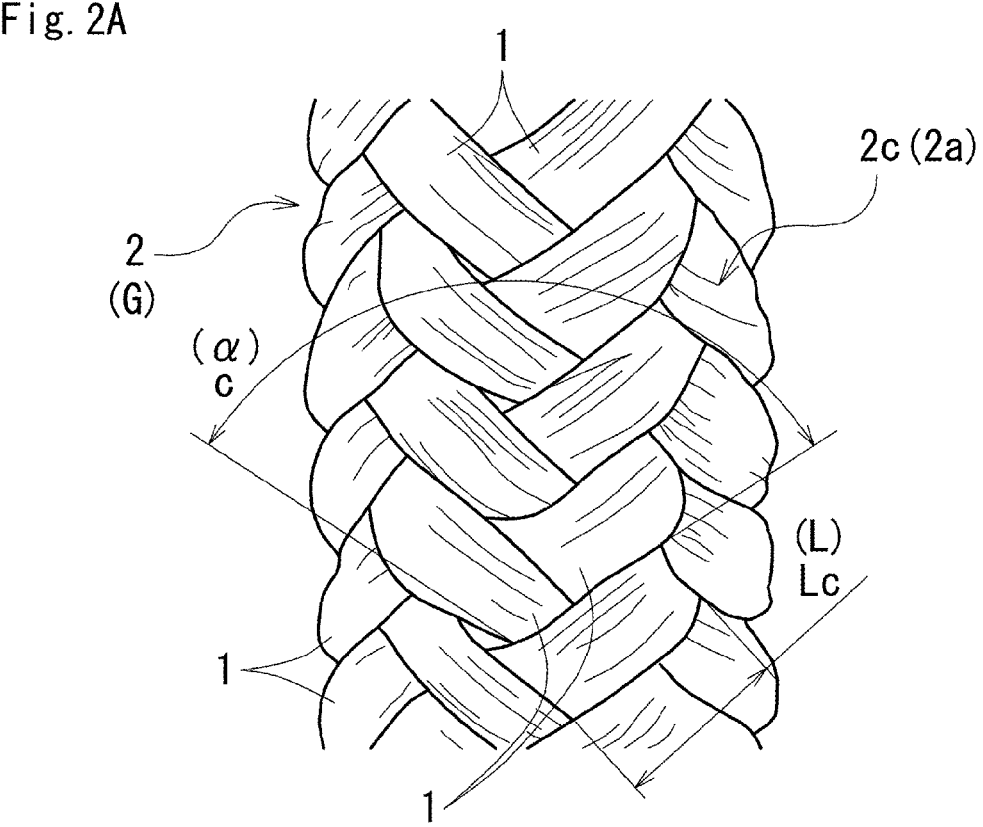
FIG. 2A shows first and third side surfaces of the packing.
Figure 2B:
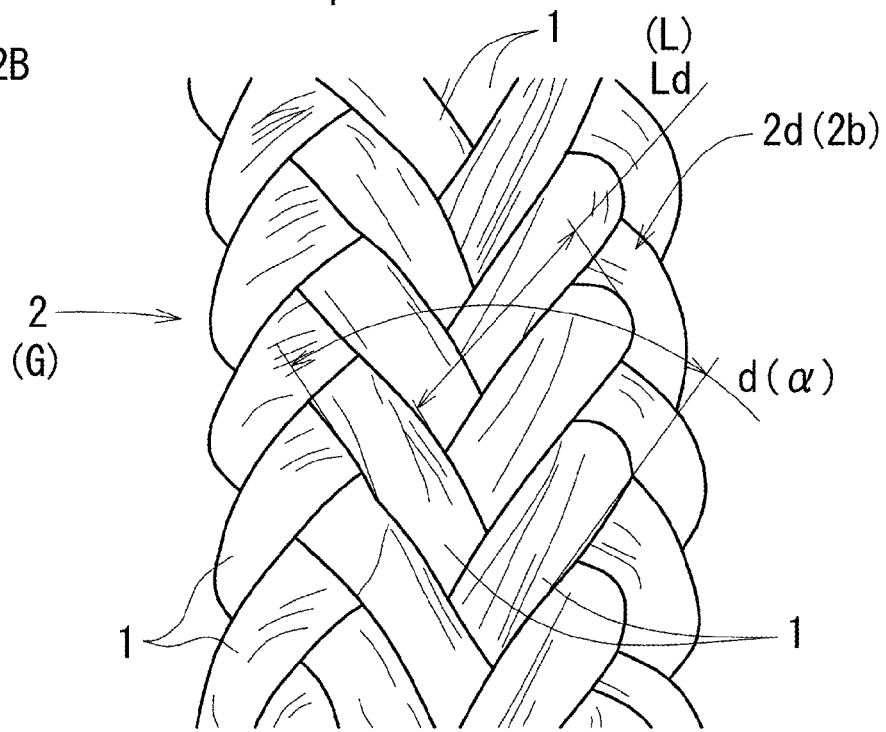
FIG. 2B shows second and fourth side surfaces.
Figure 3B:
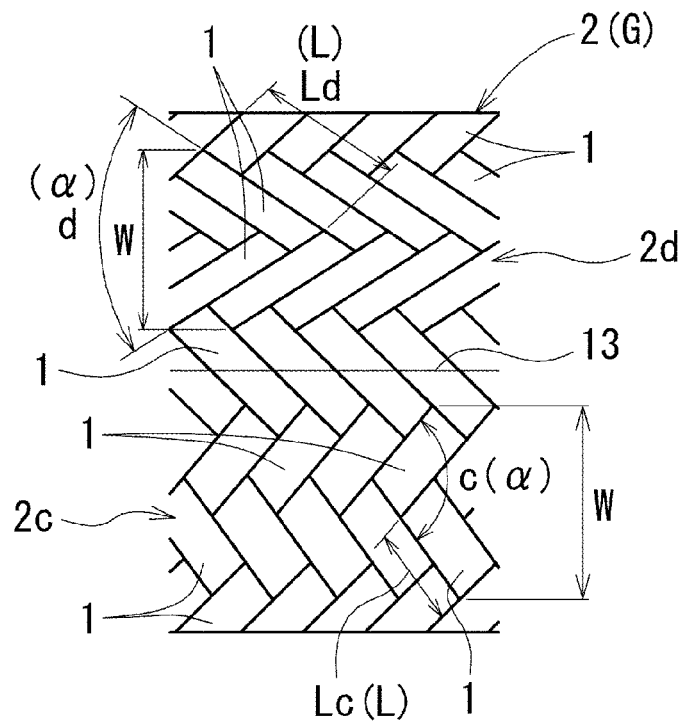

By contrast, the gland packing G of the invention is configured so that, as shown in FIGS. 1, 2, and 3B, the crossing angles α of the yarns in adjacent side surfaces (for example, the third side surface 2c and the fourth side surface 2d) in the four side surfaces 2a to 2d of the string-like member 2 are set to different angles a and b (a≠b), respectively.

In FIG. 3B, with respect to the crossing angles α, the angle c>the angle d. In the third side surface 2c and the fourth side surface 2d, with respect to the lengths L of the yarns 1 between the places where the yarns overlappingly cross each other (hereinafter, such a length is referred to as the exposed yarn length L), the length Ld in the fourth side surface 2d is distinctly longer than the length Lc on the third side surface 2c (Ld>Lc).

When, as shown in FIG. 3B, in the fourth side surface 2d, the width of two exposed yarn lengths L crossing each other is indicated by W, for example, the following expression holds:

$$\sin(d/2) = (W/2)/L.$$

Namely, $L = W/\{2 \sin(d/2)\}$.

Therefore, it is seen that, when the angle d (crossing angle α of yarns) is reduced, the exposed yarn length L is increased.

Figure 4:
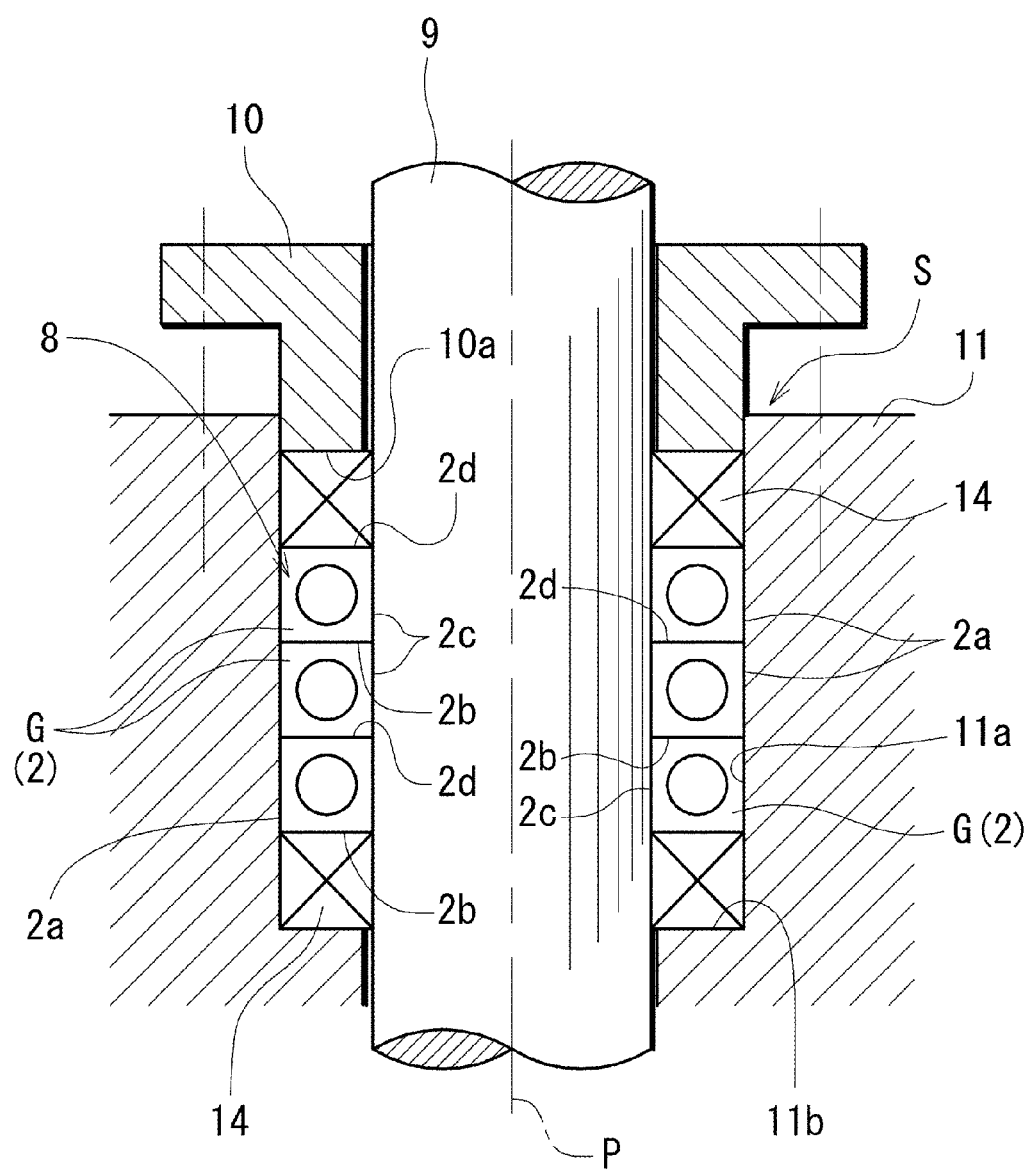
FIG. 4 is a sectional view of main portions of an example of attachment of the gland packing to an actual apparatus.

A case where the gland packing G of the invention is to be attached to an actual apparatus to be used as a sealing device S will be described. In the case where the gland packing is to be attached to a gland portion 8 of a pump as shown in FIG. 4, for example, the string-like member 2 is formed into an, annular shape in which the member is looped and its ends are butted together so that the third side surface 2c functions as the inner circumferential surface, i.e., into the gland packing G, and then inserted in a state where the member is contacted with the inner circumferential surface 11a of a gland box 11 and the stem 9. The reference numeral 11b denotes a step portion of a packing support, and 14 denotes an adaptor ring.

In this case, the second side surface 2b and the fourth side surface 2d are in a state where they are directed in the direction of the axis P of the stem 9, i.e., a state where they are contacted with an end surface 10a of a packing gland 10, or the second side surface 2b or fourth side surface 2d of the adjacent gland packings G. In this case, with respect to the exposed yarn length L, the length in the first side surface 2a=the length in the third side surface 2c<the length in the second side surface 2b=the length in the fourth side surface 2d.

In the case where the third side surface 2c is used as the inner circumferential surface, the exposed yarn length L in the third side surface 2c is short (shorter than the exposed yarn lengths L in the second and fourth side surfaces 2b, 2d). When the string-like member 2 is looped and formed as the gland packing G, therefore, the bulge caused by flexure which is produced in the third side surface 2c, and which is directed toward the radially inner side is made negligibly small. Consequently, the flatness of the third side surface 2c which is the surface to be contacted with the stem 9 is improved as compared with the packing of the prior art (see FIG. 3A), and an effect that the sealing performance is improved is achieved.

The favorable effect is similarly achieved also in the gland packing G configured by looping the string-like member 2 so that the first side surface 2a having the same crossing angle α as the third side surface 2c functions as the inner circumferential surface.

In the above-described gland packing G, the side circumferential surfaces (doughnut-like surfaces which connect the inner and outer circumferential surfaces with each other) are formed by the second and fourth side surfaces 2b, 2d of the string-like member 2. In the second and fourth side surfaces 2b, 2d, the exposed yarn lengths L are long (longer than the exposed yarn lengths L in the first and third side surfaces 2a, 2c). When the string-like member 2 is looped and formed as the gland packing G, therefore, bulges which form relatively clear concaves and convexes are produced by flexure that is in the second and fourth side surfaces 2b, 2d, and that is directed toward the radially inward side. The concave and convex bulges engage with those on the fourth and second side surfaces 2d, 2b of the adjacent gland packings G, and an effect that a mutual rotation preventing function is produced can be exerted.

In the gland packing G, in the edge portion 13 formed by the adjacent side surfaces 2c, 2d of the string-like member 2, the yarns 1 which are continuous from one side surface 2c of the adjacent side surfaces to the other side surface 2d are placed as shown in FIGS. 1, 2, and 3B. This configuration is identical also in the other adjacent side surfaces 2a, 2b (2b, 2c and 2d, 2a).

The configuration where the continuous yarns 1 are placed in the edge portions 13 produces effects that the edge portions 13 are protected, and that the yarns 1 are prevented from loosening. In the case where the gland packing is used as the sealing device S in the gland portion 8 of the pump as shown in FIG. 4, the string-like member 2 is looped and then inserted as the annular gland packing G. In this case, also a further advantage that deformation due to flexure of the edge portion 13 is prevented from occurring is achieved.

Figure 8A:
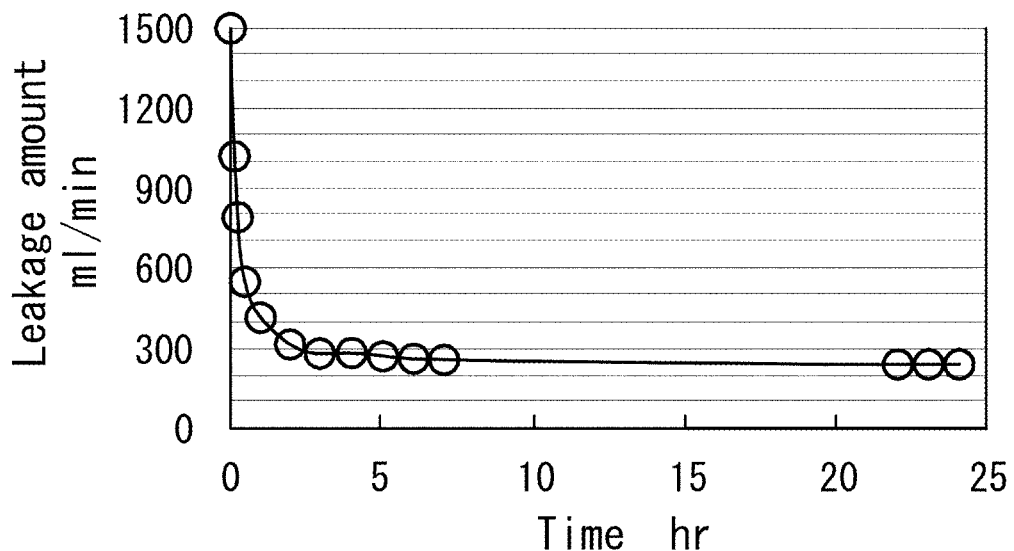
FIGS. 8A and 8B are relational graphs of the time and a leakage amount.
Figure 8B:
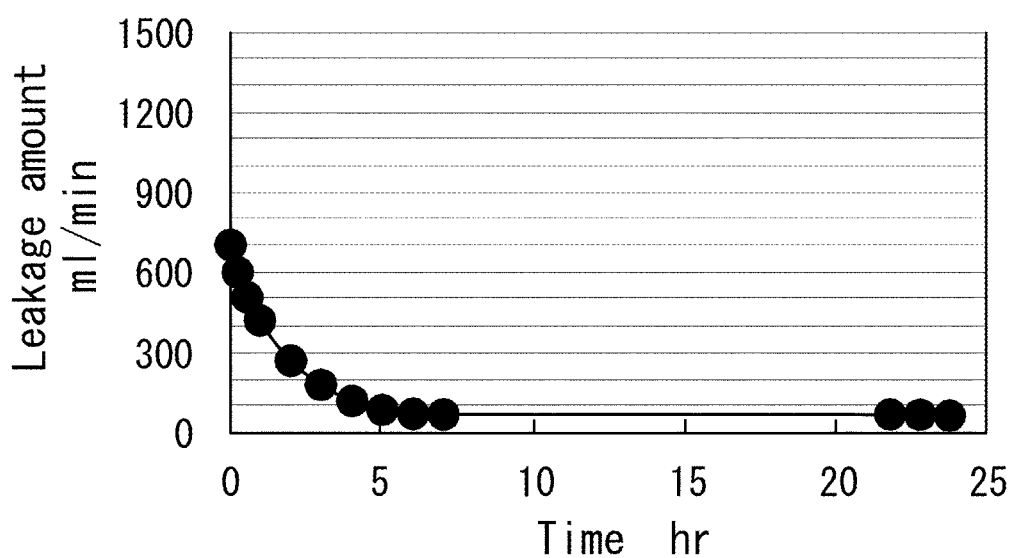

In order to verify the above-described effects related to sealing, leakage tests on the gland packing G were performed with respect to a gland packing of the prior art, and the gland packing of the invention. FIGS. 7, 8A, and 8B show results of the tests. In both the gland packings of the prior art and the invention, the tendency that the leakage amount is largely reduced after elapse of several hours from the start of the test, and then gradually reduced is substantially similarly achieved. However, their absolute values are largely different from each other. Immediately after the start of the test, the leakage amount (leakage amount per unit time) in the gland packing of the invention is about ⅓ to ½ of that in the gland packing of the prior art. After elapse of several hours, the leakage amount in the gland packing of the invention is about ¼ of that in the gland packing of the prior art. It is seen that a significant improvement is achieved.

Next, the configuration where the crossing angles α in the third side surface 2c can be made larger than that in the prior art (angle c, see FIG. 3B) (the exposed yarn length L can be made longer than that in the prior art) will be studied from the viewpoint of production. FIGS. 9A to 18B show operation diagrams of conditions of yarns in which positions of the second and third yarn bobbins 4, 5 that are moved along, the second and third movement paths w2, w3 on the third side surface 2c with lapse of time are indicated.

In FIGS. 5 and 6, the movement paths w1 to w4 are illustrated while simplifying the paths to a combination of linear and semicircular movements. Actually, however, the movement paths are formed by combinations of a large number of gear trains 12, 7 as shown in FIGS. 9A to 18B, and each of the movement paths w1 to w4 is a movement path (movement locus) in which arcuate movements are alternately repeated. In FIGS. 9A to 18B, the second movement path w2 is indicated by the solid line, and the third movement path w3 is indicated by the broken line.

Figure 9A:
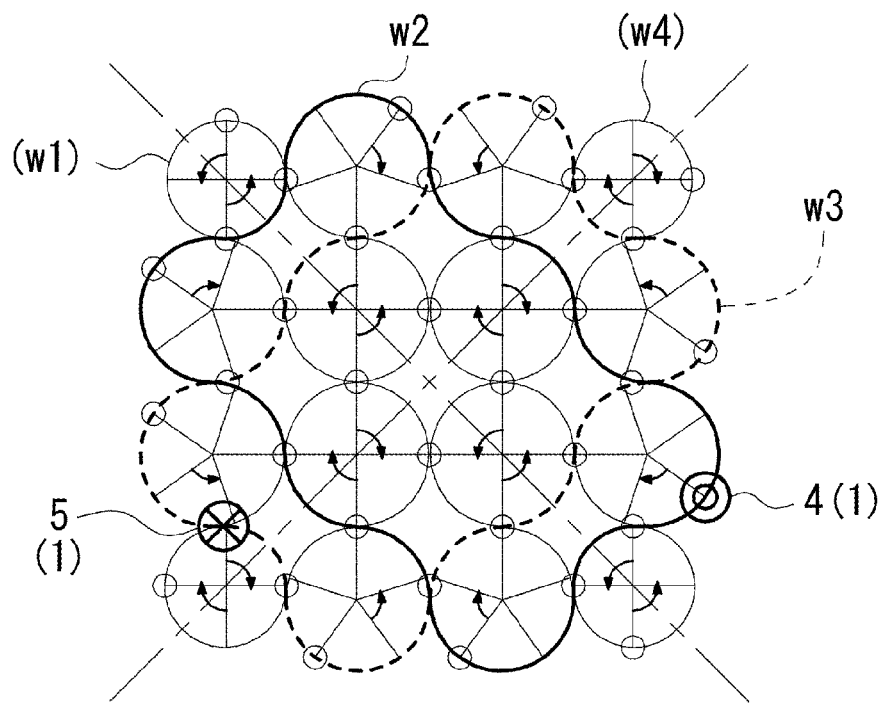
FIGS. 9A and 9B show the conditions of yarns in the third side surface.
Figure 9B:
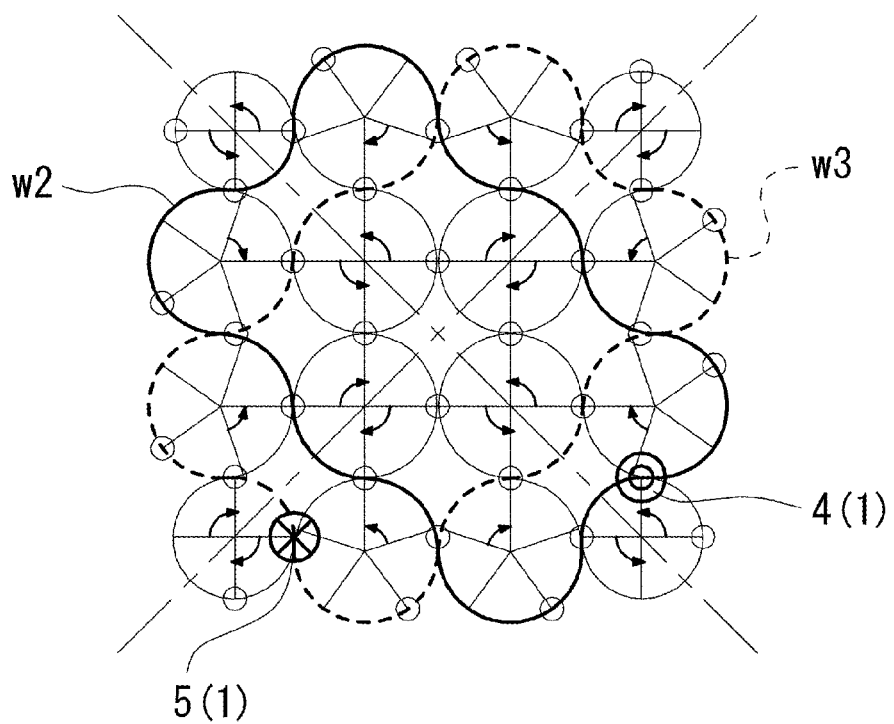

First, the condition shown in FIG. 9A indicates the starting positions or first positions of the second and third yarn bobbins 4, 5, and FIG. 9B indicates second positions of the second and third yarn bobbins 4, 5 where each of the bobbins is moved by a distance corresponding to ⅕ rotation from the first position. In the 16 gear trains 12, 13, the diameters of corner gears 7 at the four corners are set to ⅘ of those of the other 12 gears or ordinary gears 12, and the gear trains are configured in a state where, when the ordinary gears 12 make ⅘ rotation, the corner gears 7 make one rotation.

Figure 10A:
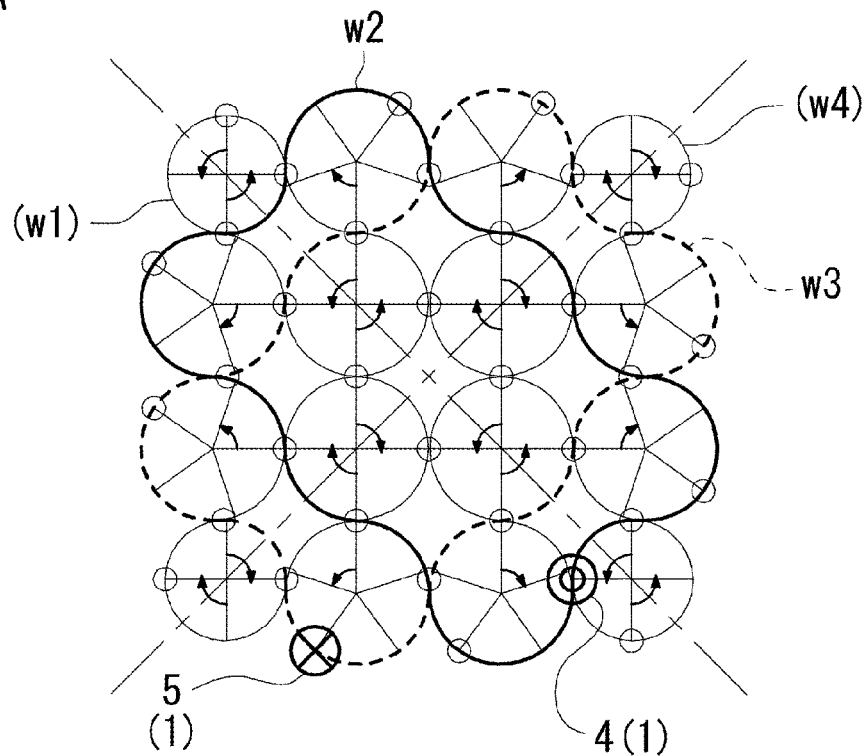
FIGS. 10A and 10B show the conditions of yarns in the third side surface.

FIG. 10A indicates a third position where, in the second and third movement paths w2, w3, each of the second and third yarn bobbins 4, 5 (yarns 1) is moved by a distance corresponding to ¼ rotation of the corner gears 7, from the second position indicated in FIG. 9B.

Figure 10B:
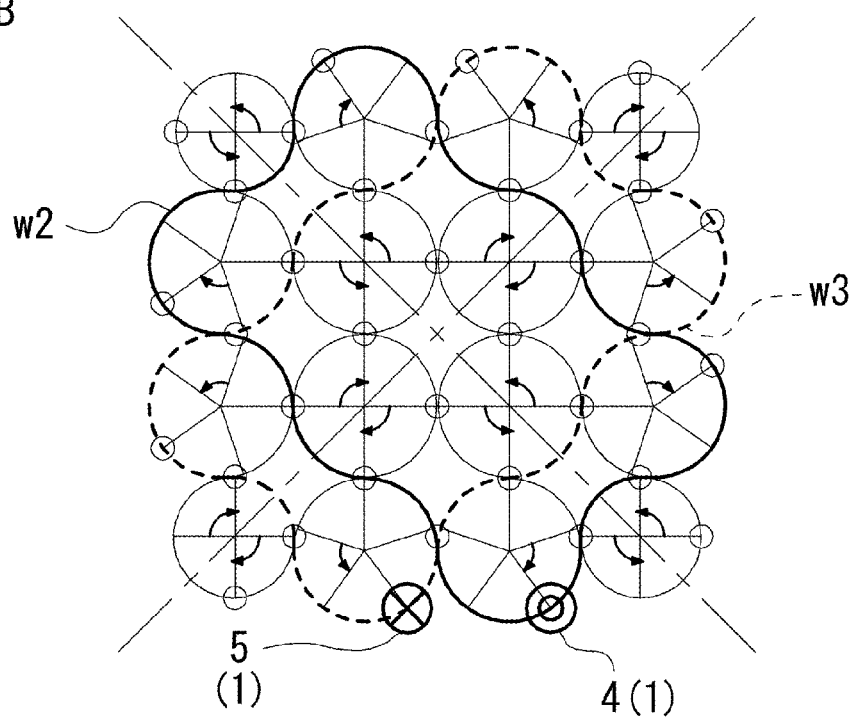

FIG. 10B indicates a fourth position where each of the second and third yarn bobbins 4, 5 is moved by a distance corresponding to ⅕ rotation of the ordinary gears 12, from the third position indicated in FIG. 10A.

Figure 11A:
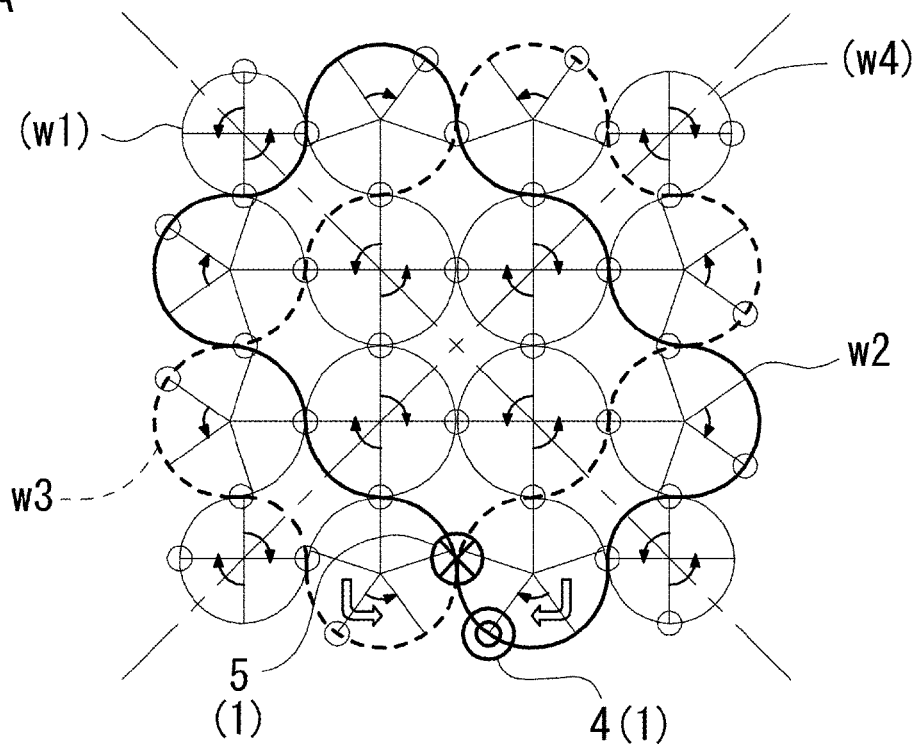
FIGS. 11A and 11B show the conditions of yarns in the third side surface.

FIG. 11A indicates a fifth position where each of the second and third yarn bobbins 4, 5 is moved by a distance corresponding to ⅕ rotation of the ordinary gears 12, from the fourth position indicated in FIG. 10B.

Figure 11B:
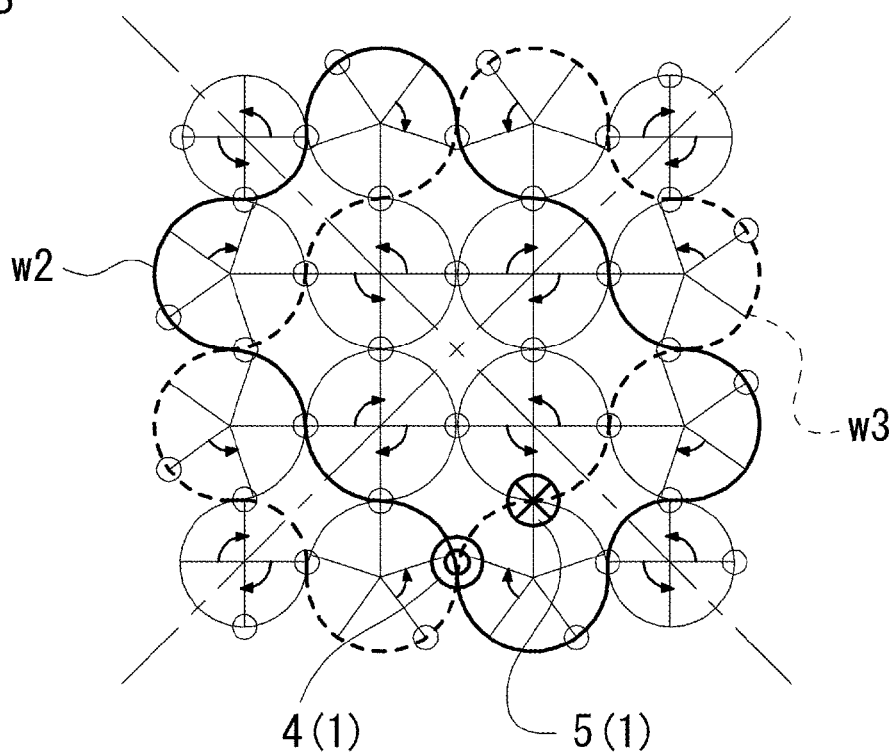

FIG. 11B indicates a sixth position where each of the second and third yarn bobbins 4, 5 is moved by a distance corresponding to ⅕ rotation of the ordinary gears 12, from the fifth position indicated in FIG. 11A. The movement from the fifth position to the sixth position causes the second and third yarn bobbins 4, 5 to cross each other.

Figure 12A:
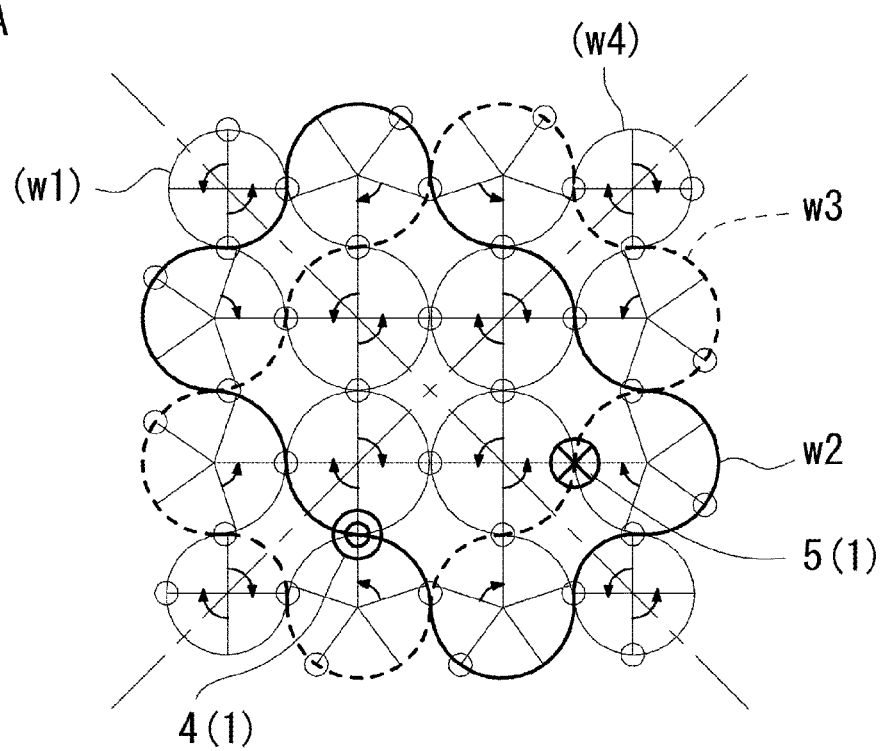
FIGS. 12A and 12B show the conditions of yarns in the third side surface.

FIG. 12A indicates a seventh position where, in the second and third movement paths w2, w3, each of the second and third yarn bobbins 4, 5 (yarns 1) is moved by a distance corresponding to ⅕ rotation of the ordinary gears 12, from the sixth position indicated in FIG. 11B.

Figure 12B:
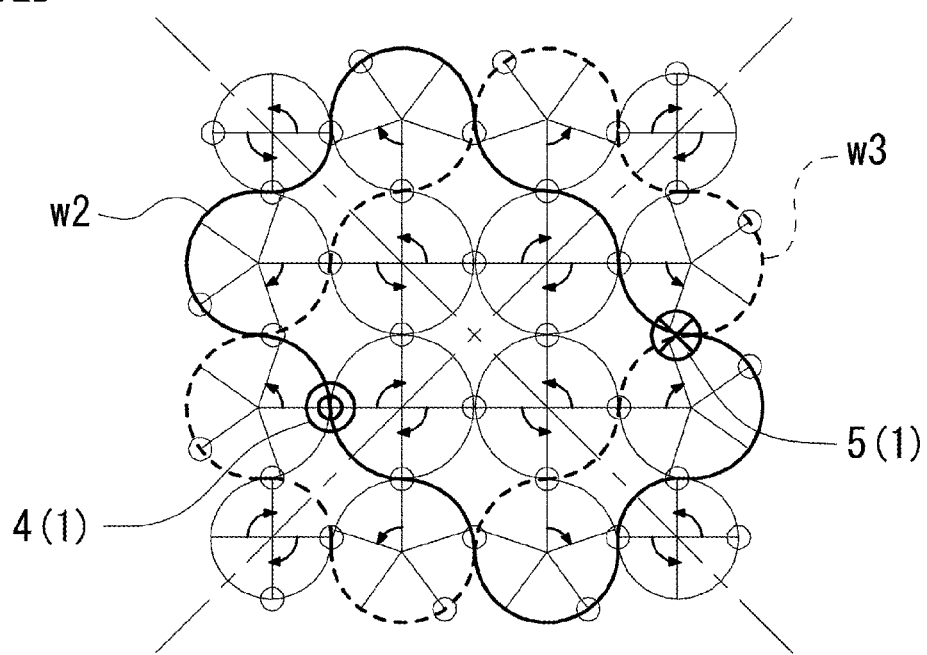

FIG. 12B indicates an eighth position where each of the second and third yarn bobbins 4, 5 is moved by a distance corresponding to ⅕ rotation of the ordinary gears 12, from the seventh position indicated in FIG. 12A.

Figure 13A:
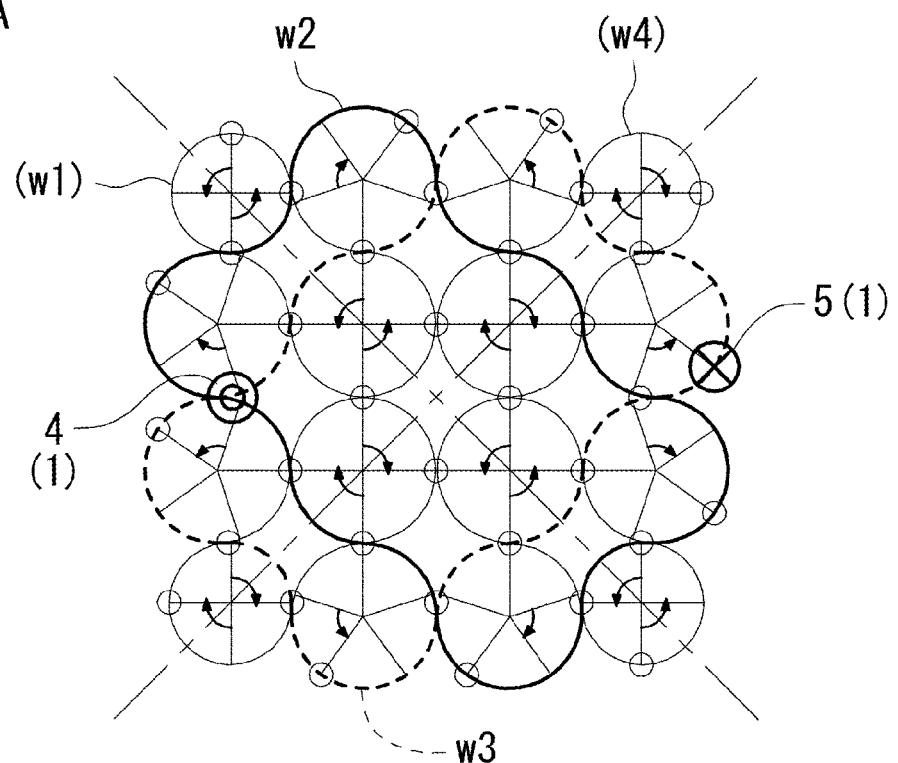
FIGS. 13A and 13B show the conditions of yarns in the third side surface.

FIG. 13A indicates a ninth position where each of the second and third yarn bobbins 4, 5 is moved by a distance corresponding to ⅕ rotation of the ordinary gears 12, from the eighth position indicated in FIG. 12B.

Figure 13B:
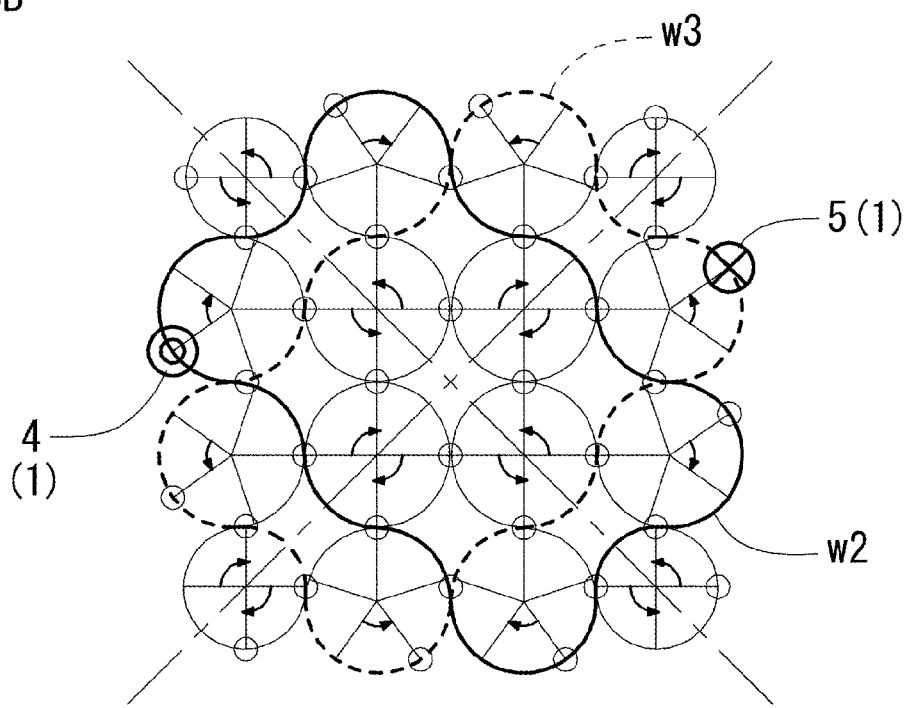

FIG. 13B indicates a tenth position where each of the second and third yarn bobbins 4, 5 is moved by a distance corresponding to ⅕ rotation of the ordinary gears 12, from the ninth position indicated in FIG. 13A. When the second and third yarn bobbins 4, 5 which cross each other at the sixth position reach the tenth position that is opposite (the reverse side) to the sixth position, the crossing angles α of the yarns 1 at the sixth position are made larger (for example, the angle c indicated in FIG. 3B). The tenth position is a position which is moved by 4 steps (⅘ rotation) from the sixth position, and in which the exposed yarn length L is relatively short.

Figure 14A:
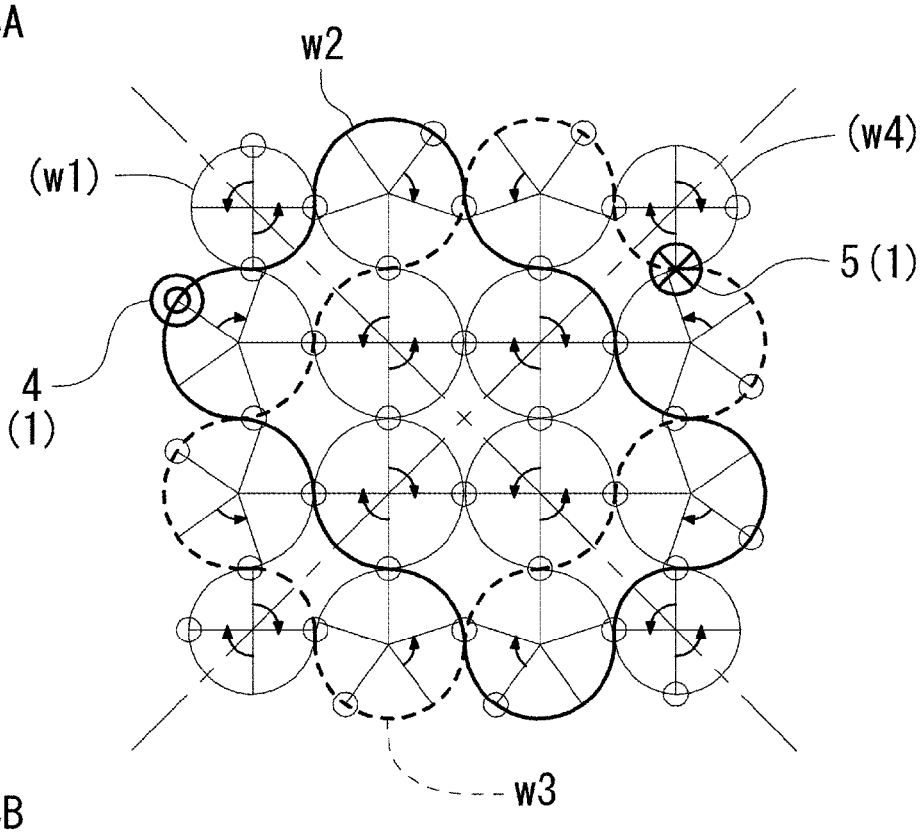
FIGS. 14A and 14B show the conditions of yarns in the third side surface.

FIG. 14A indicates an eleventh position where, in the second and third movement paths w2, w3, each of the second and third yarn bobbins 4, 5 (yarns 1) is moved by a distance corresponding to ⅕ rotation of the ordinary gears 12, from the tenth position indicated in FIG. 13B.

Figure 14B:
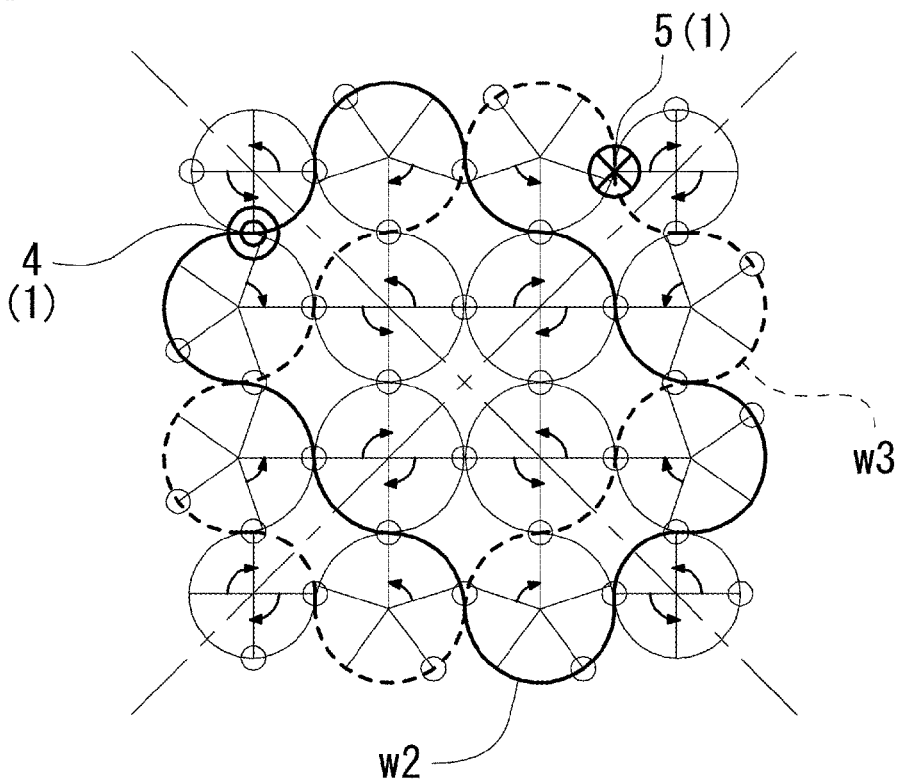

FIG. 14B indicates a twelfth position where each of the second and third yarn bobbins 4, 5 is moved by a distance corresponding to ¼ rotation of the corner gears 7, from the eleventh position indicated in FIG. 14A.

Figure 15A:
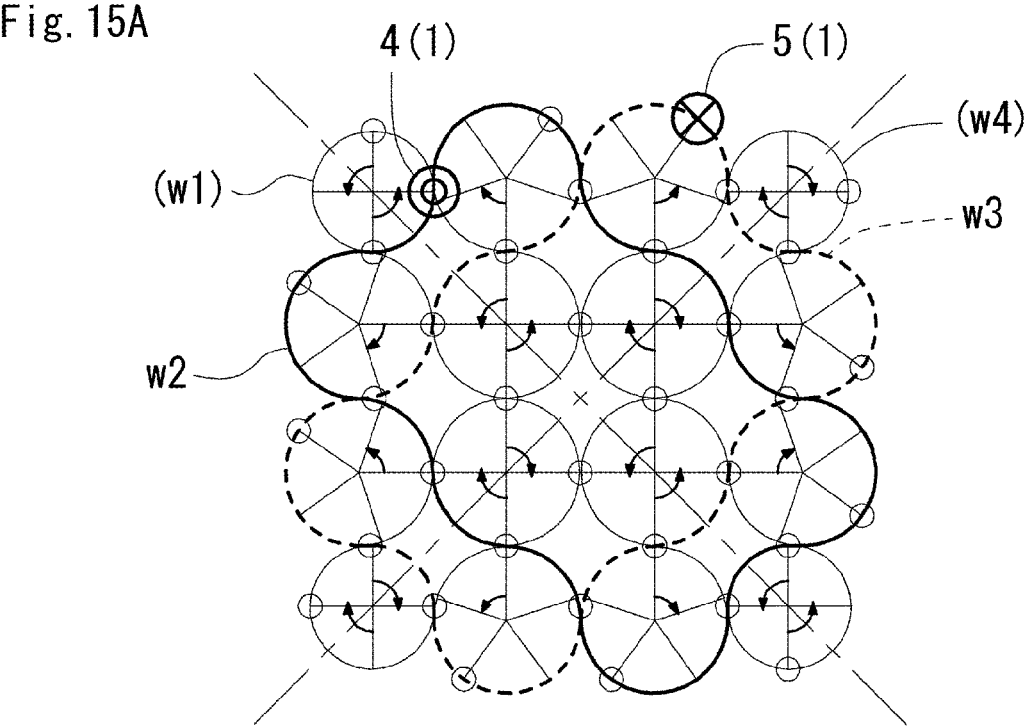
FIGS. 15A and 15B show the conditions of yarns in the third side surface.

FIG. 15A indicates a thirteenth position where each of the second and third yarn bobbins 4, 5 is moved by a distance corresponding to ⅕ rotation of the ordinary gears 12, from the twelfth position indicated in FIG. 14B.

Figure 15B:
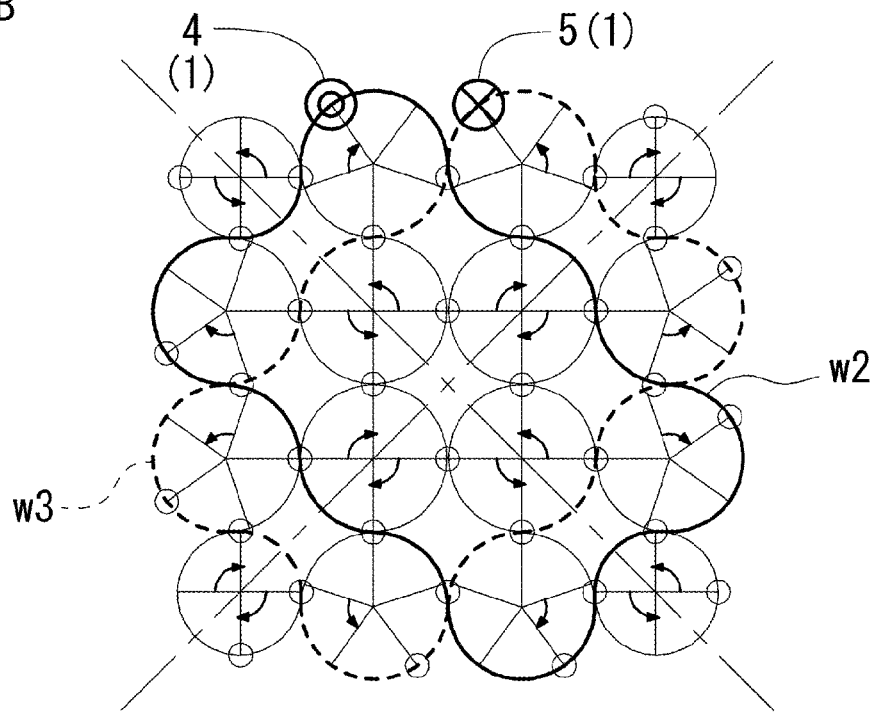

FIG. 15B indicates a fourteenth position where each of the second and third yarn bobbins 4, 5 is moved by a distance corresponding to ⅕ rotation of the ordinary gears 12, from the thirteenth position indicated in FIG. 15A.

Figure 16A:
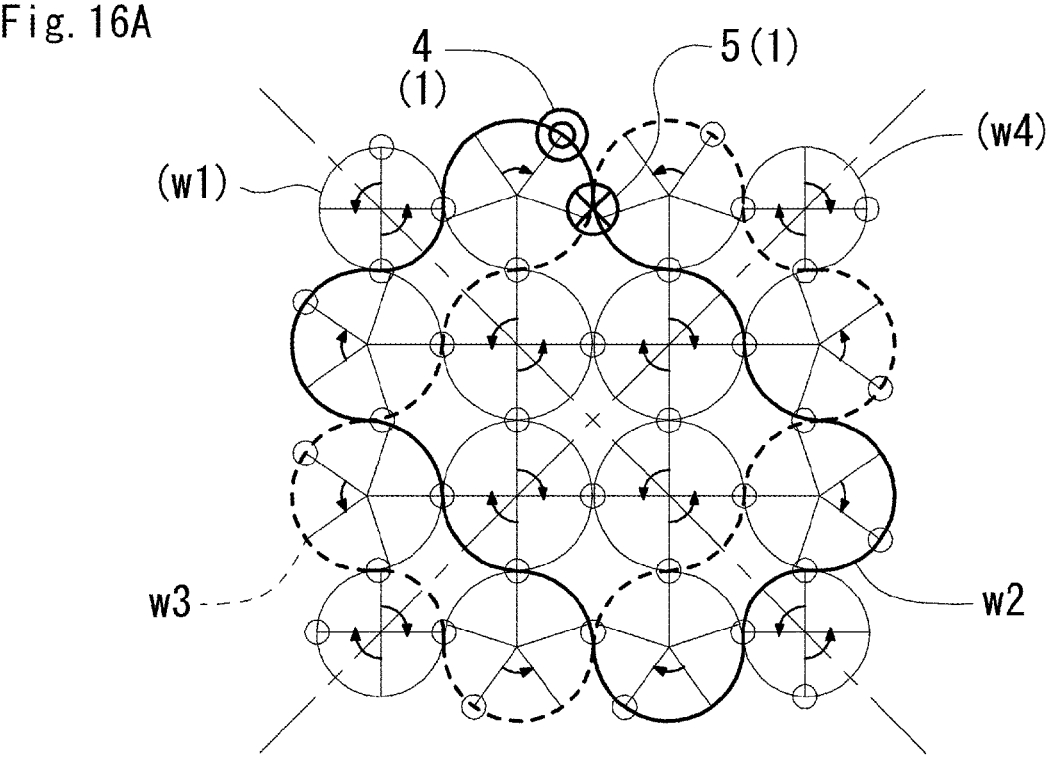
FIGS. 16A and 16B show the conditions of yarns in the third side surface.

FIG. 16A indicates a fifteenth position where, in the second and third movement paths w2, w3, each of the second and third yarn bobbins 4, 5 (yarns 1) is moved by a distance corresponding to ⅕ rotation of the ordinary gears 12, from the fourteenth position indicated in FIG. 15B.

Figure 16B:
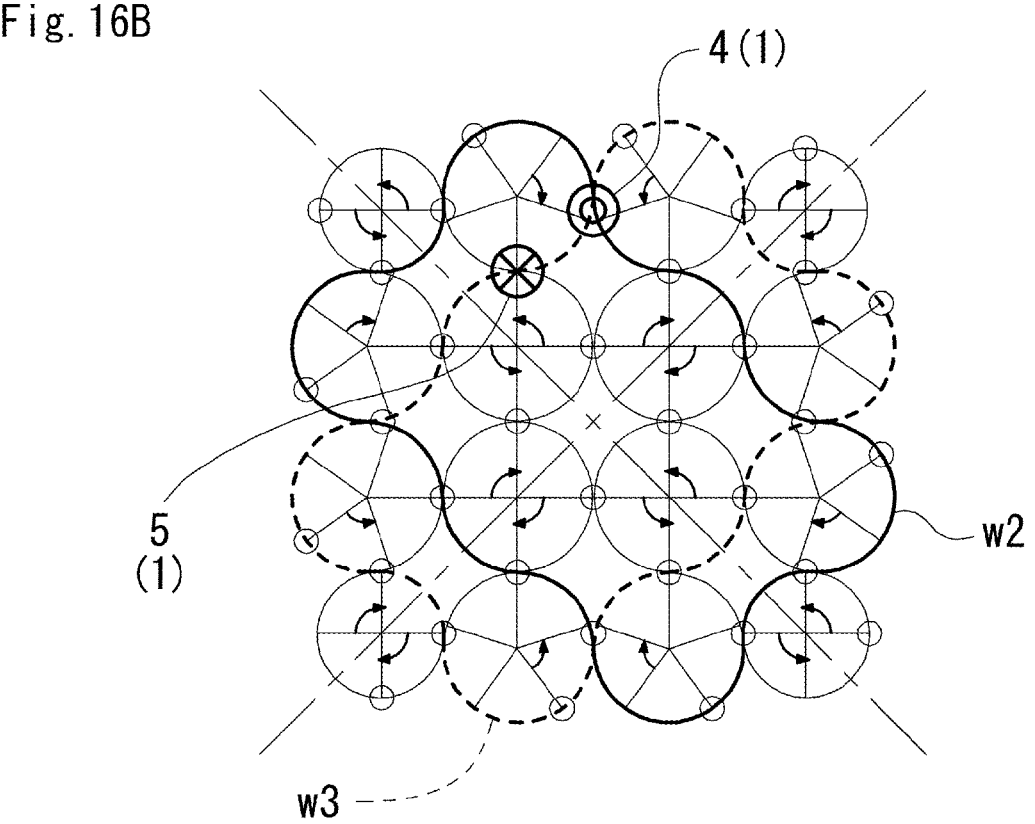

FIG. 16B indicates a sixteenth position where each of the second and third yarn bobbins 4, 5 is moved by a distance corresponding to ⅕ rotation of the ordinary gears 12, from the fifteenth position indicated in FIG. 16A.

Figure 17A:
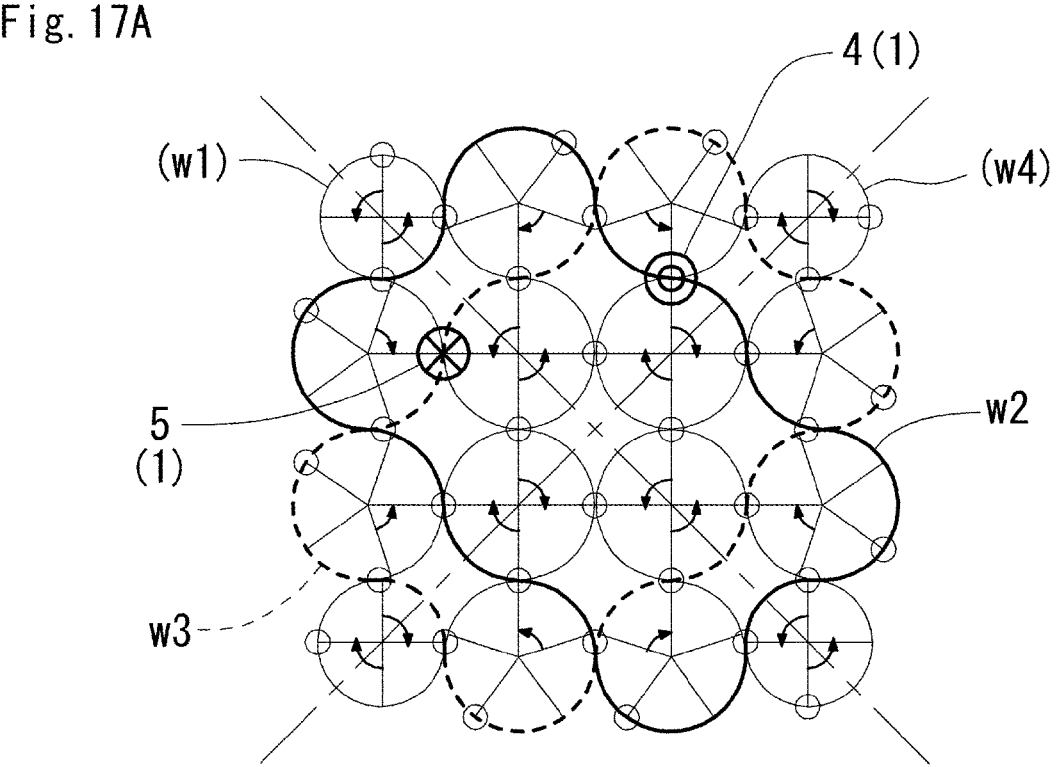
FIGS. 17A and 17B show the conditions of yarns in the third side surface.

FIG. 17A indicates a seventeenth position where each of the second and third yarn bobbins 4, 5 is moved by a distance corresponding to ⅕ rotation of the ordinary gears 12, from the sixteenth position indicated in FIG. 16B.

Figure 17B:
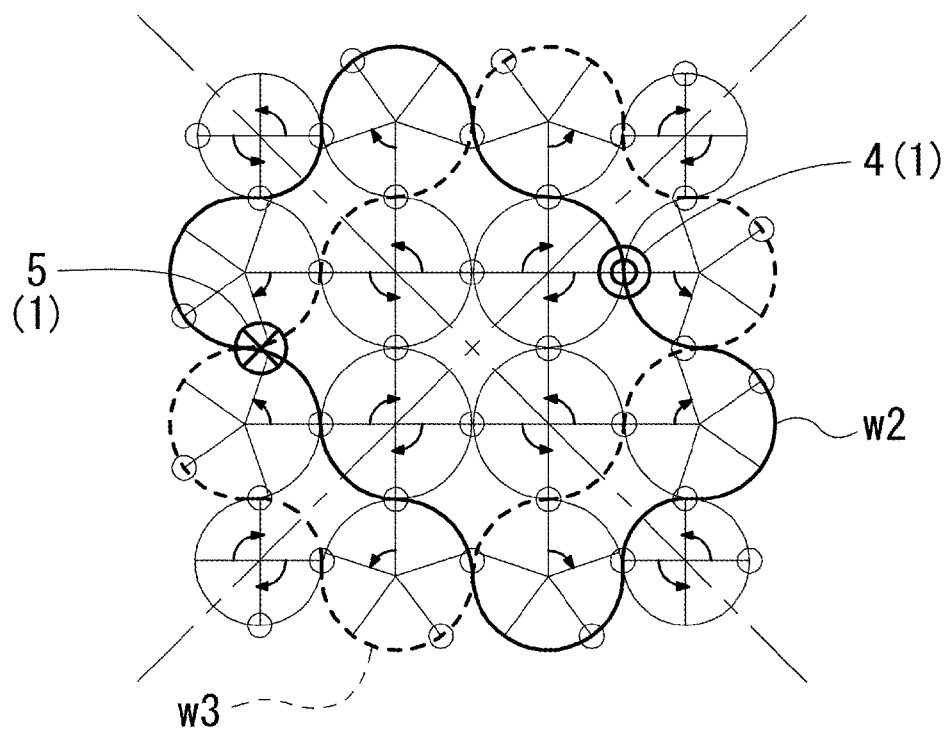

FIG. 17B indicates an eighteenth position where each of the second and third yarn bobbins 4, 5 is moved by a distance corresponding to ⅕ rotation of the ordinary gears 12, from the seventeenth position indicated in FIG. 17A.

Figure 18A:
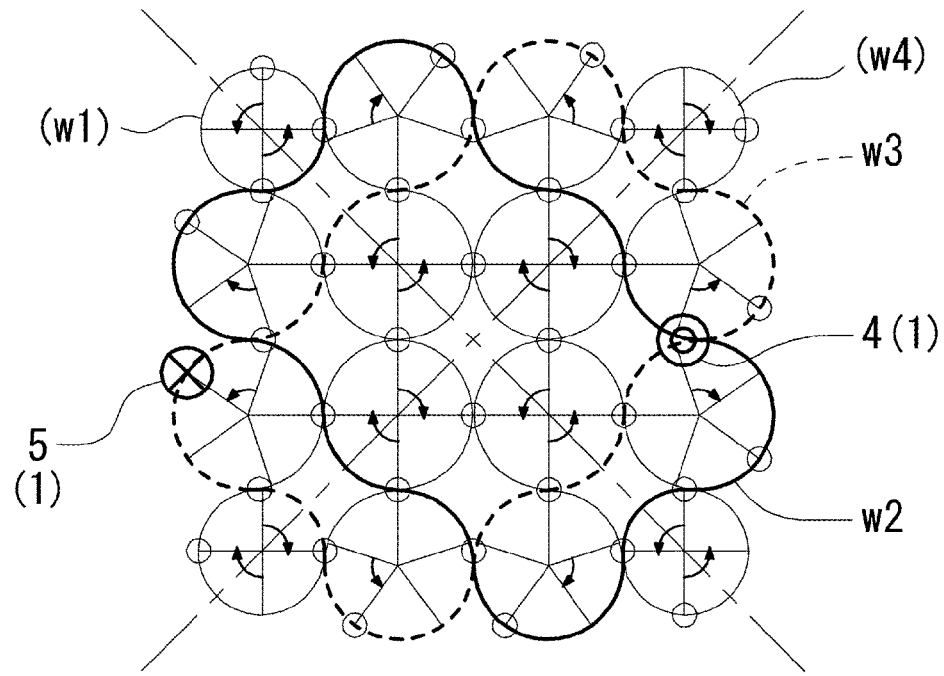
FIGS. 18A and 18B show the conditions of yarns in the third side surface.

FIG. 18A indicates a nineteenth position where, in the second and third movement paths w2, w3, each of the second and third yarn bobbins 4, 5 (yarns 1) is moved by a distance corresponding to ⅕ rotation of the ordinary gears 12, from the eighteenth position indicated in FIG. 17B.

Figure 18B:
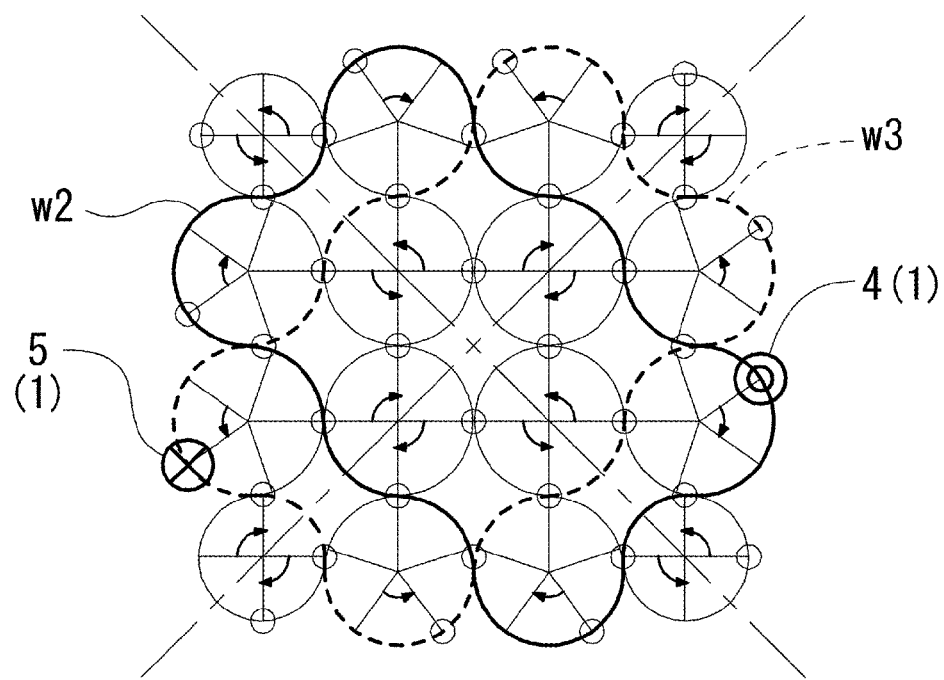

FIG. 18B indicates a twentieth position where each of the second and third yarn bobbins 4, 5 is moved by a distance corresponding to ⅕ rotation of the ordinary gears 12, from the nineteenth position indicated in FIG. 18A.

Then, each of the second and third yarn bobbins 4, 5 is moved by a distance corresponding to 1/5 rotation of the ordinary gears 12, from the twentieth position indicated in FIG. 18B, and the bobbins return to the first position indicated, in FIG. 9A. The movement from the first position to the twentieth position is one cycle of the movement paths w2, w3 on the third side surface 2c.

Next, the configuration where the crossing angles α in the fourth side surface 2d can be made smaller than that in the prior art (angle d, see FIG. 3B) (the exposed yarn length L can be made shorter than that in the prior art) will be studied from the viewpoint of production. FIGS. 19A to 28B show operation diagrams of conditions of yarns in which positions of the second and third yarn bobbins 4, 5 that are moved along the second and third movement paths w2, w3 on the fourth side surface 2d with lapse of time are indicated.

Also in FIGS. 19A to 28B, similarly with FIGS. 9A to 18B, each of the movement paths w1 to w4 is a movement path (movement locus) in which arcuate movements are alternately repeated. Similarly with FIGS. 9A to 18B, the second movement path w2 is indicated by the solid line, and the third movement path w3 is indicated by the broken line.

Figure 19A:
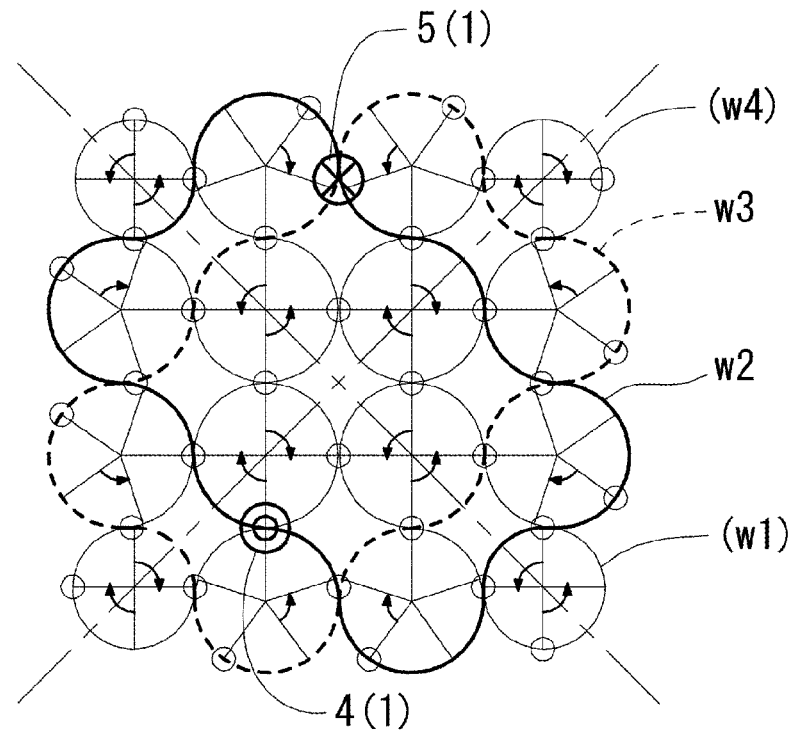
FIGS. 19A and 19B show the conditions of yarns in the fourth side surface.
Figure 19B:
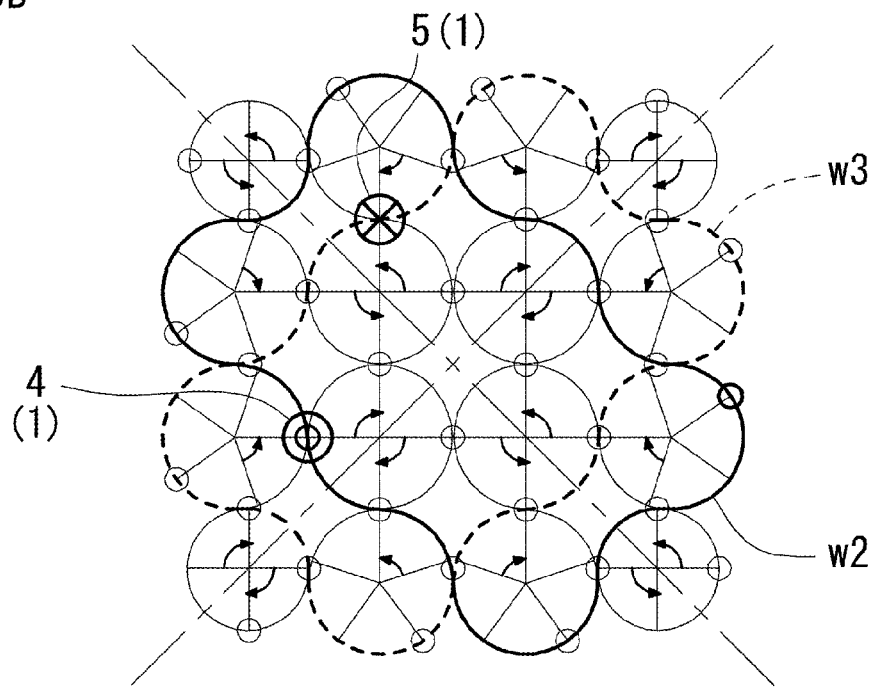

First, the condition shown in FIG. 19A indicates the starting positions or first positions of the second and third yarn bobbins 4, 5 in the fourth side surface 2d, and FIG. 19B indicates second positions of the second and third yarn bobbins 4, 5 where each of the bobbins is moved by a distance corresponding to ⅕ rotation of the ordinary gears 12 from the first position. In FIGS. 19A to 28B, similarly with FIGS. 9A to 18B, in the 16 gear trains 12, 13, the diameters of corner gears 7 at the four corners are set to ⅘ of those of the other 12 gears or ordinary gears 12, and the gear trains are configured in a state where, when the ordinary gears 12 make ⅘ rotation, the corner gears 7 make one rotation.

Figure 20A:
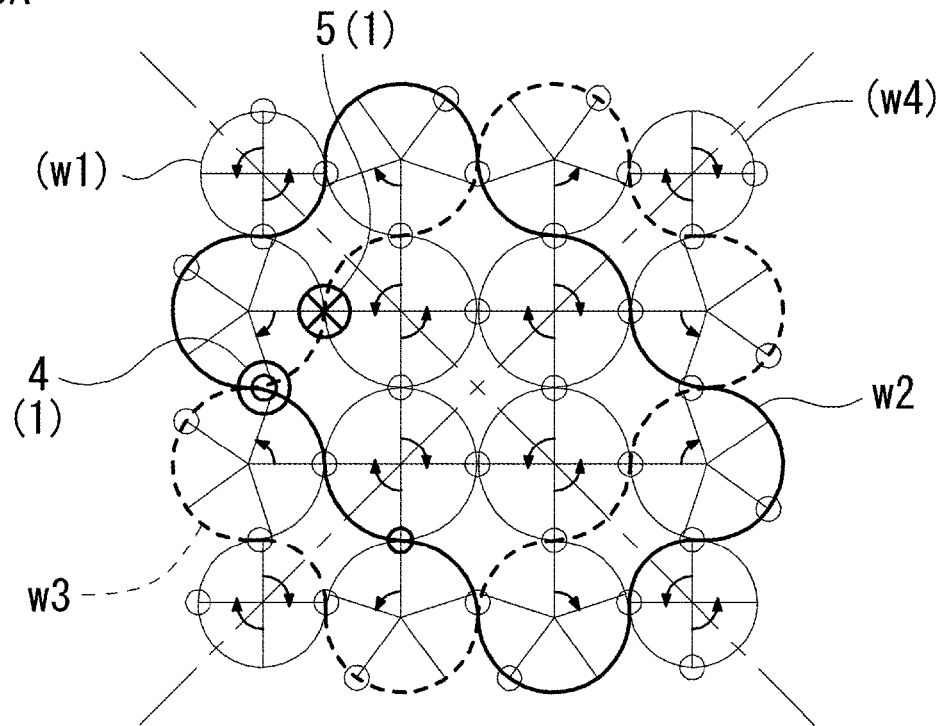
FIGS. 20A and 20B show the conditions of yarns in the fourth side surface.

FIG. 20A indicates a third position where, in the second and third movement paths w2, w3, each of the second and third yarn bobbins 4, 5 (yarns 1) is moved by a distance corresponding to ⅕ rotation of the ordinary gears 12, from the second position indicated in FIG. 19B.

Figure 20B:
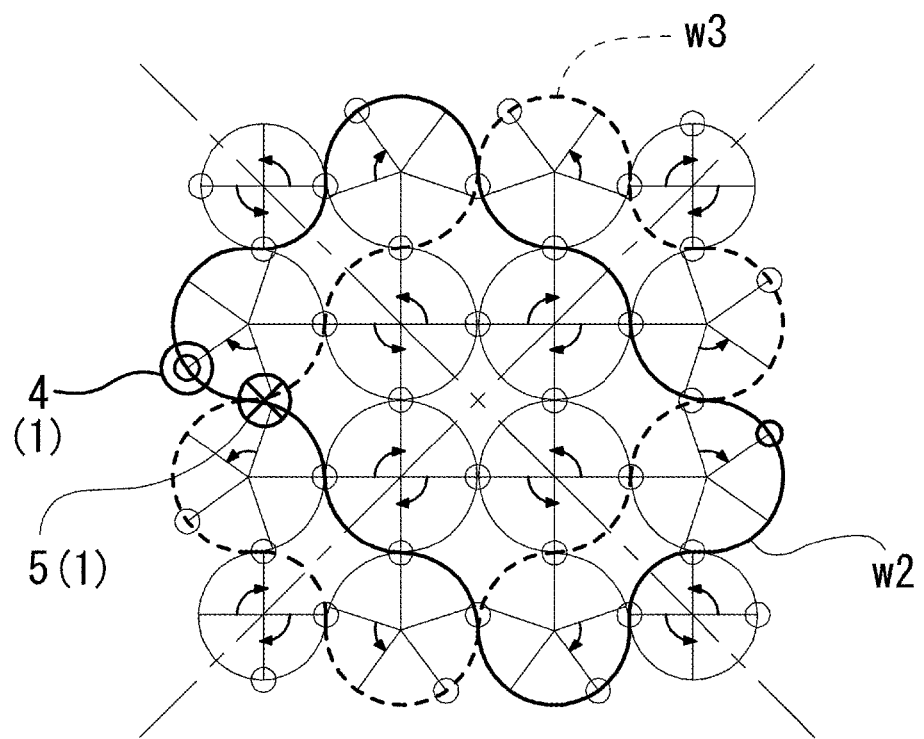

FIG. 20B indicates a fourth position where each of the second and third yarn bobbins 4, 5 is moved by a distance corresponding to ⅕ rotation of the ordinary gears 12, from the third position indicated in FIG. 20A. The movement from the third position to the fourth position causes the second and third yarn bobbins 4, 5 to cross each other.

Figure 21A:
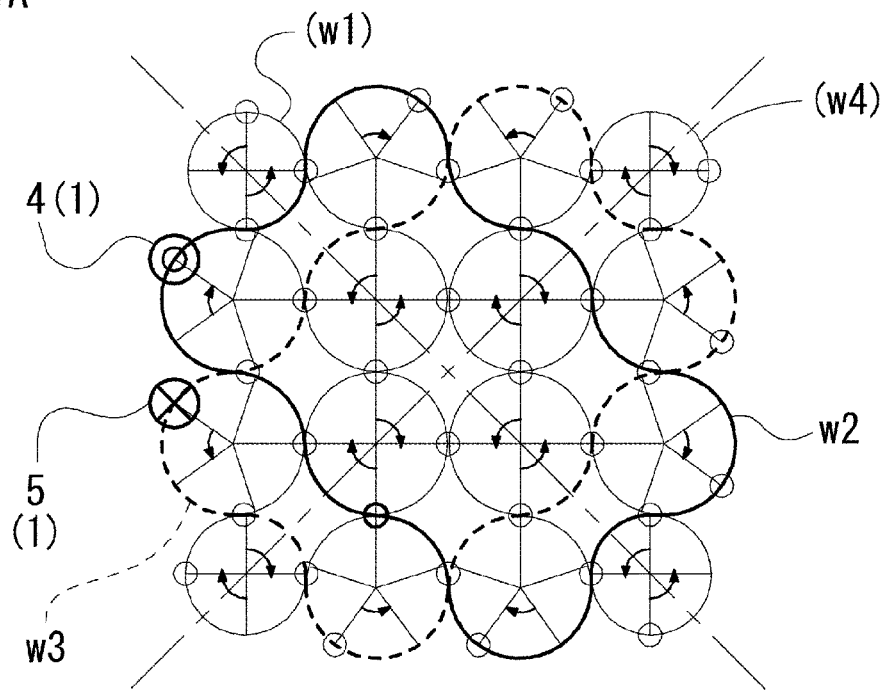
FIGS. 21A and 21B show the conditions of yarns in the fourth side surface.

FIG. 21A indicates a fifth position where each of the second and third yarn bobbins 4, 5 is moved by a distance corresponding to ⅕ rotation of the ordinary gears 12, from the fourth position indicated in FIG. 20B.

Figure 21B:
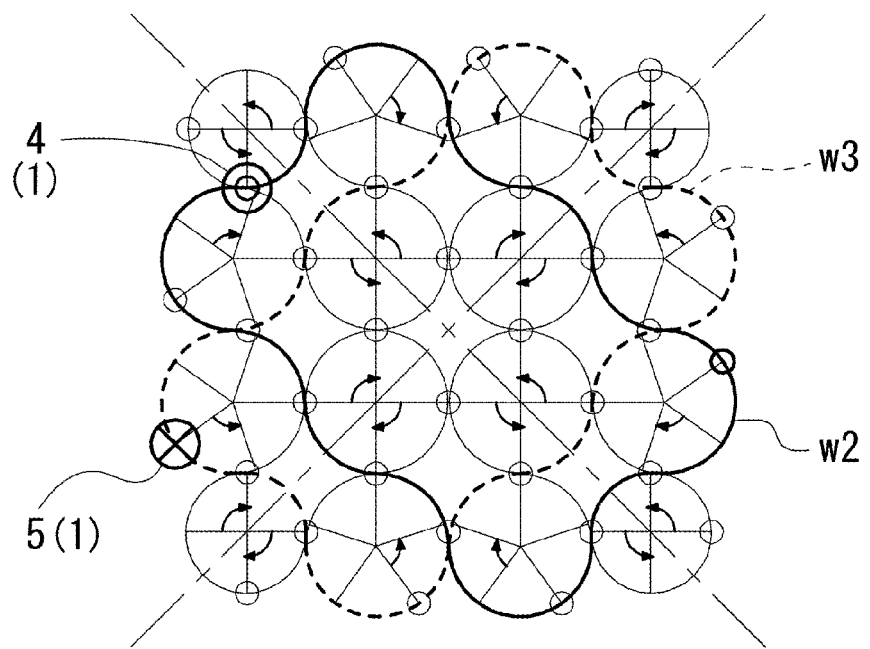

FIG. 21B indicates a sixth position where each of the second and third yarn bobbins 4, 5 is moved by a distance corresponding to ⅕ rotation of the ordinary gears 12, from the fifth position indicated in FIG. 21A.

Figure 22A:
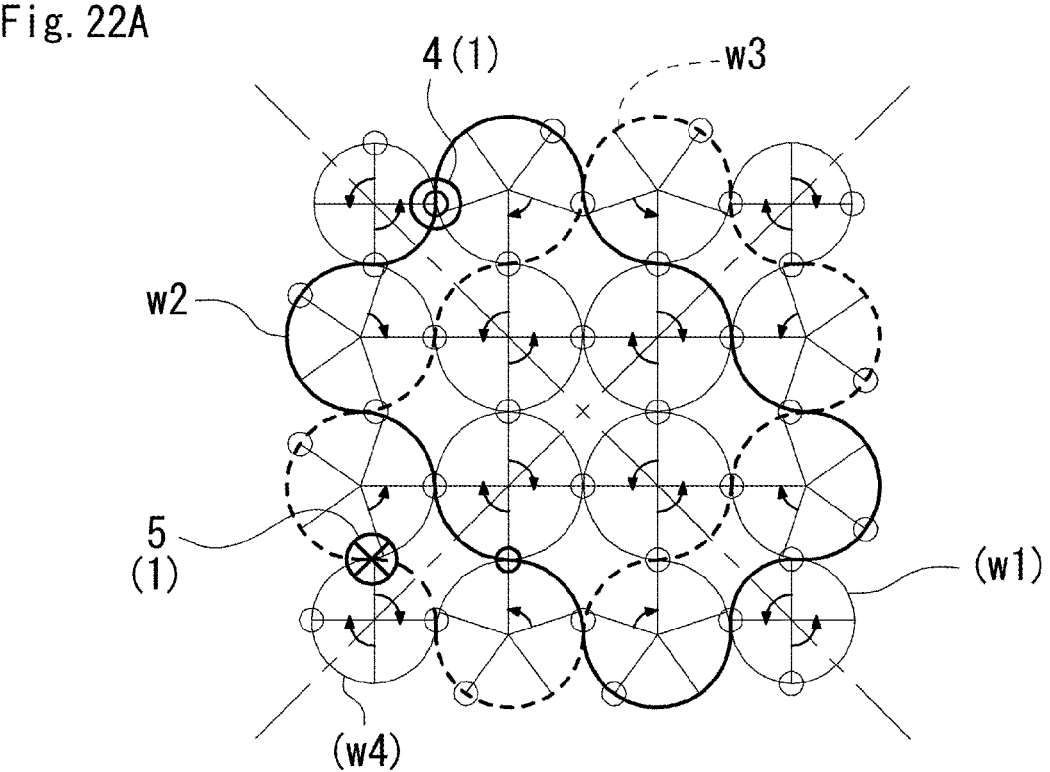
FIGS. 22A and 22B show the conditions of yarns in the fourth side surface.

FIG. 22A indicates a seventh position where, in the second and third movement paths w2, w3, the second yarn bobbin 4 (yarns 1) is moved by a distance corresponding to ¼ rotation of the corner gears 7, and the third yarn bobbin 5 (yarns 1) is moved by a distance corresponding to ⅕ rotation of the ordinary gears 12, from the sixth position indicated in FIG. 21B.

Figure 22B:
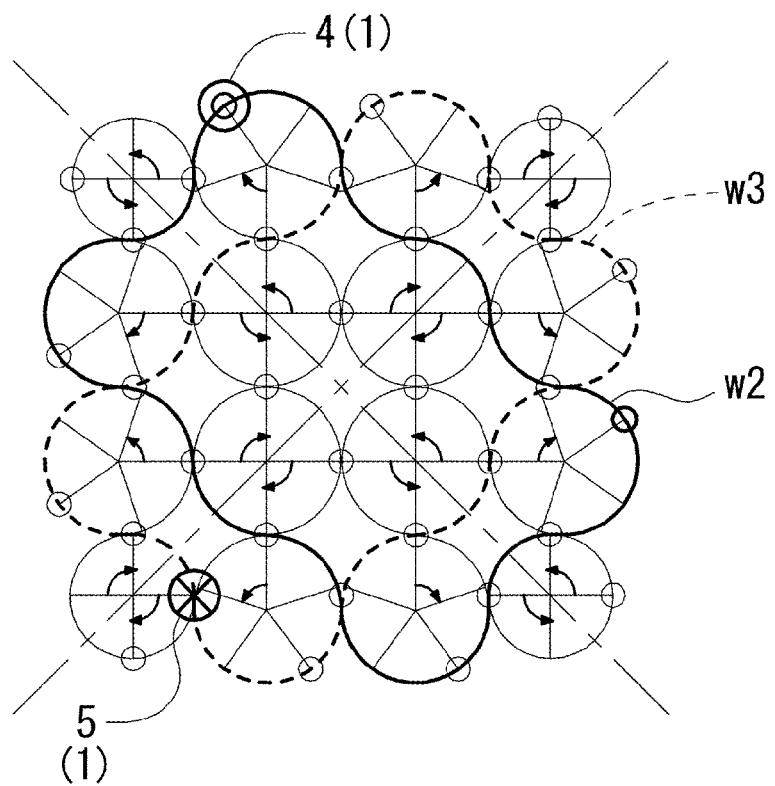

FIG. 22B indicates an eighth position where the second yarn bobbin 4 is moved by a distance corresponding to ⅕ rotation of the ordinary gears 12, and the third yarn bobbin 5 is moved by a distance corresponding to ¼ rotation of the corner gears 7, from the seventh position indicated in FIG. 22A.

Figure 23A:
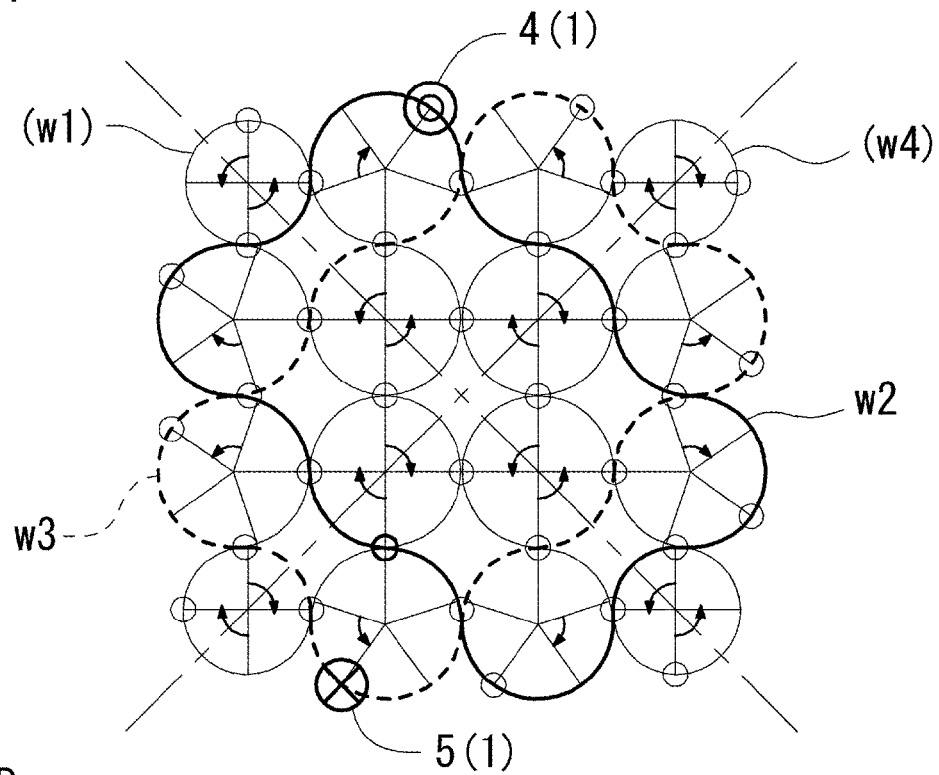
FIGS. 23A and 23B show the conditions of yarns in the fourth side surface.

FIG. 23A indicates a ninth position where each of the second and third yarn bobbins 4, 5 is moved by a distance corresponding to ⅕ rotation of the ordinary gears 12 from the eighth position indicated in FIG. 22B.

Figure 23B:
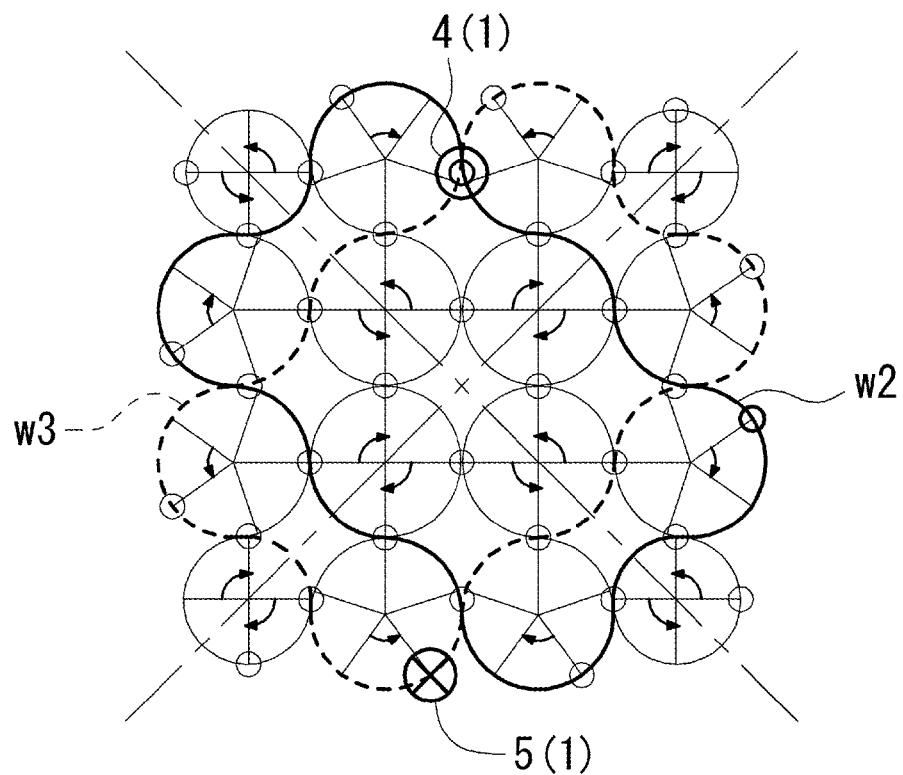

FIG. 23B indicates a tenth position where each of the second and third yarn bobbins 4, 5 is moved by a distance corresponding to ⅕ rotation of the ordinary gears 12, from the ninth position indicated in FIG. 23A.

Figure 24A:
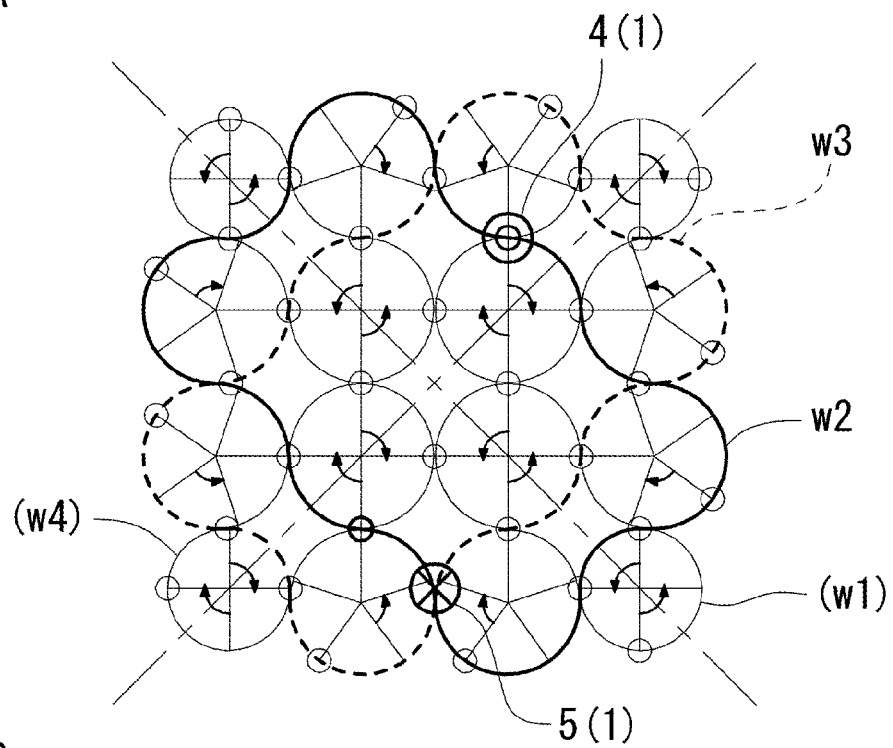
FIGS. 24A and 24B show the conditions of yarns in the fourth side surface.

FIG. 24A indicates an eleventh position where, in the second and third movement paths w2, w3, each of the second and third yarn bobbins 4, 5 (yarns 1) is moved by a distance corresponding to ⅕ rotation of the ordinary gears 12, from the tenth position indicated in FIG. 23B.

Figure 24B:
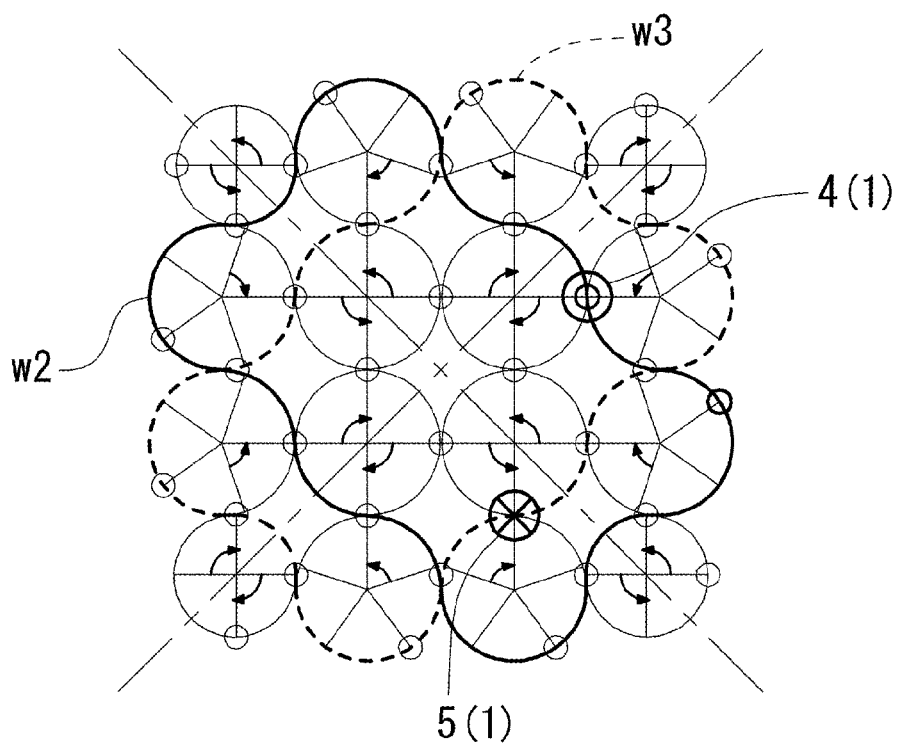

FIG. 24B indicates a twelfth position where each of the second and third yarn bobbins 4, 5 is moved by a distance corresponding to ¼ rotation of the corner gears 7, from the eleventh position indicated in FIG. 24A.

When the second and third yarn bobbins 4, 5 which cross each other at the fourth position reach the twelfth position that is opposite (the reverse side) to the fourth position, the yarn bobbins take a posture in which the yarn bobbins are further directed to the inner side. Namely, the crossing angles α of the yarns 1 at the fourth position are made smaller (for example, the angle d indicated in FIG. 3B). The twelfth position is a position which is moved by 8 steps (8/5 rotation) from the fourth position. The crossing angle d is smaller than the crossing angle c at the sixth position in the third side surface 2c, and therefore the exposed yarn length L is distinctly longer than that in the case of the third side surface 2c.

Figure 25A:
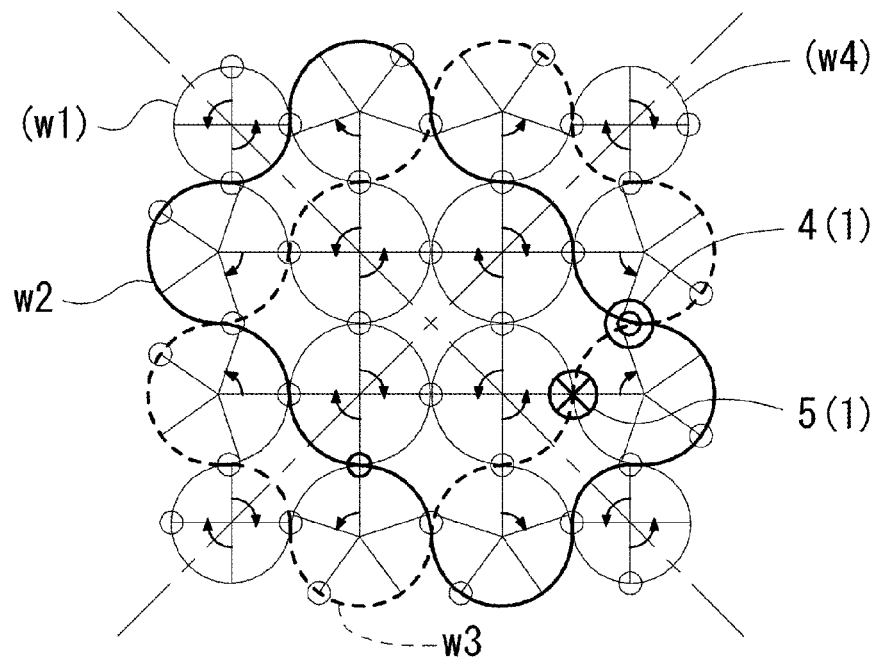
FIGS. 25A and 25B show the conditions of yarns in the fourth side surface.

FIG. 25A indicates a thirteenth position where, in the second and third movement paths w2, w3, each of the second and third yarn bobbins 4, 5 (yarns 1) is moved by a distance corresponding to ⅕ rotation of the ordinary gears 12, from the twelfth position indicated in FIG. 24B.

Figure 25B:
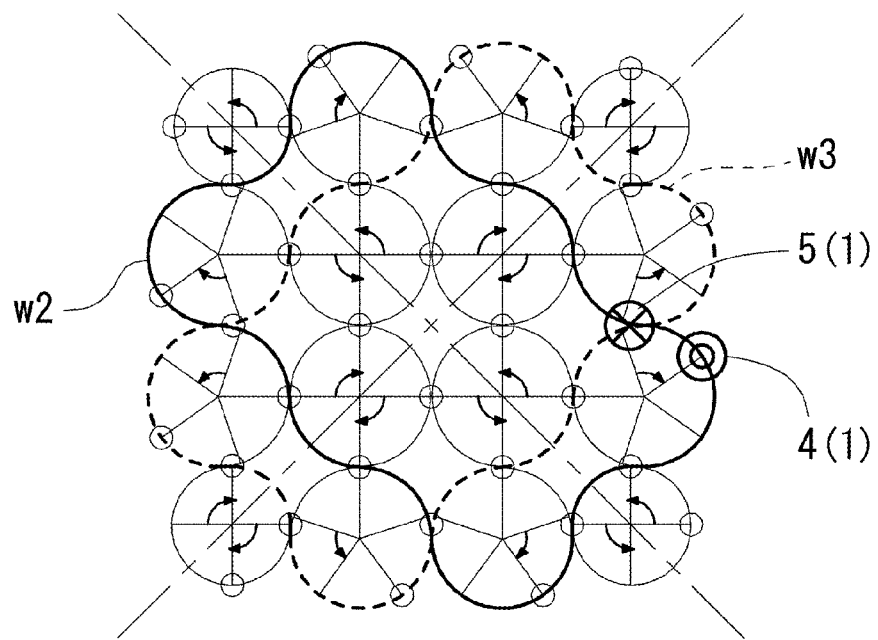

FIG. 25B indicates a fourteenth position where each of the second and third yarn bobbins 4, 5 is moved by a distance corresponding to ⅕ rotation of the ordinary gears 12, from the thirteenth position indicated in FIG. 25A.

Figure 26A:
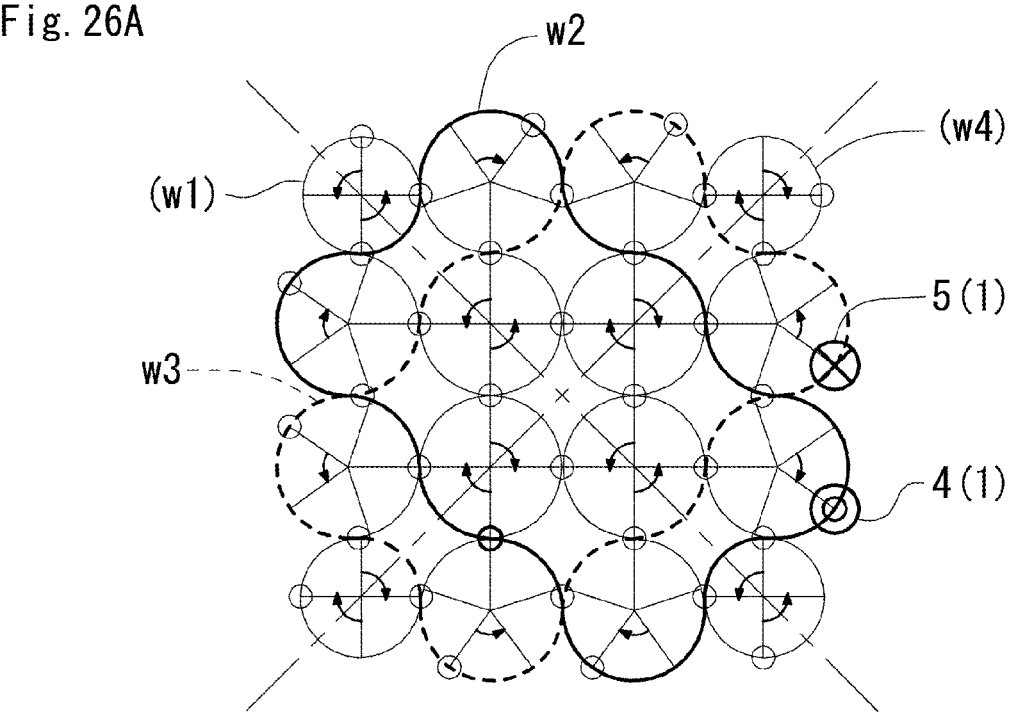
FIGS. 26A and 26B show the conditions of yarns in the fourth side surface.

FIG. 26A indicates a fifteenth position where each of the second and third yarn bobbins 4, 5 is moved by a distance corresponding to ⅕ rotation of the ordinary gears 12, from the fourteenth position indicated in FIG. 25B.

Figure 26B:
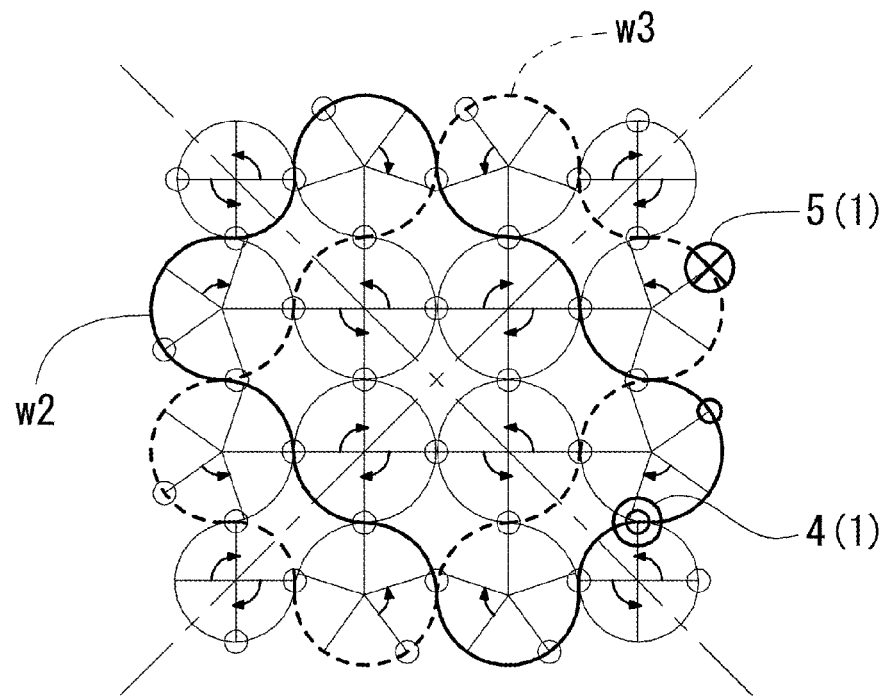

FIG. 26B indicates a sixteenth position where each of the second and third yarn bobbins 4, 5 is moved by a distance corresponding to ⅕ rotation of the ordinary gears 12, from the fifteenth position indicated in FIG. 26A.

Figure 27A:
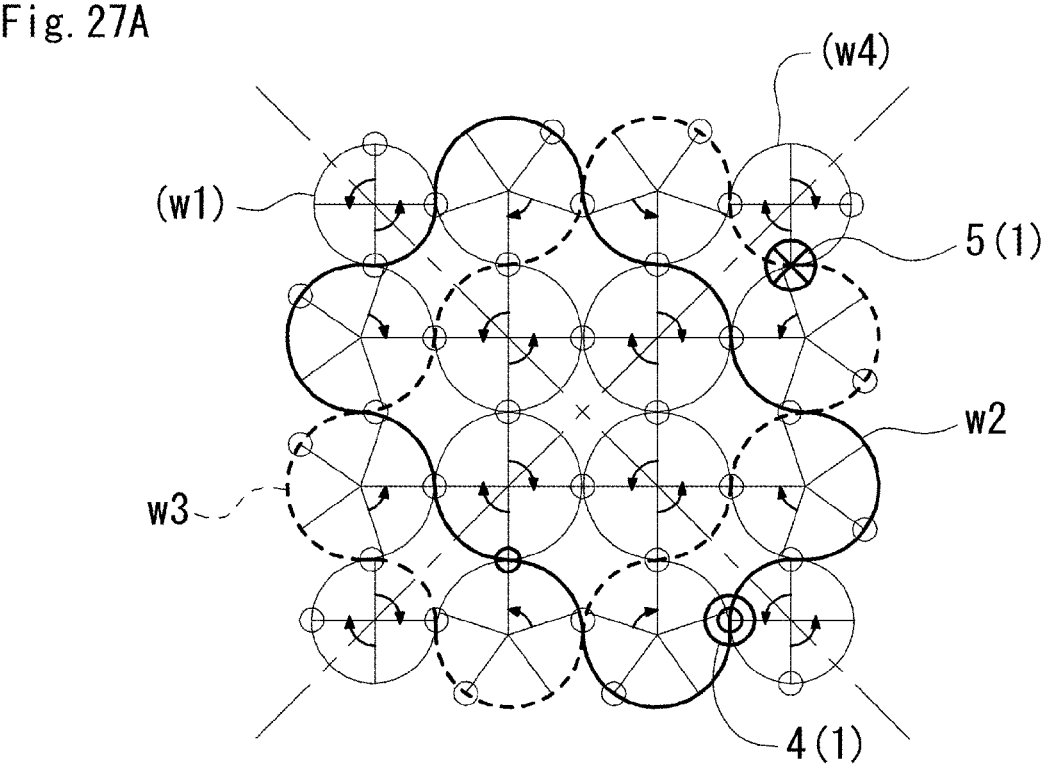
FIGS. 27A and 27B show the conditions of yarns in the fourth side surface.

FIG. 27A indicates a seventeenth position where the second yarn bobbin 4 (yarn 1) is moved by a distance corresponding to ¼ rotation of the corner gears 7, and the third yarn bobbin 5 (yarn 1) is moved by a distance corresponding to ⅕ rotation of the ordinary gears 12, from the sixteenth position indicated in FIG. 26B.

Figure 27B:
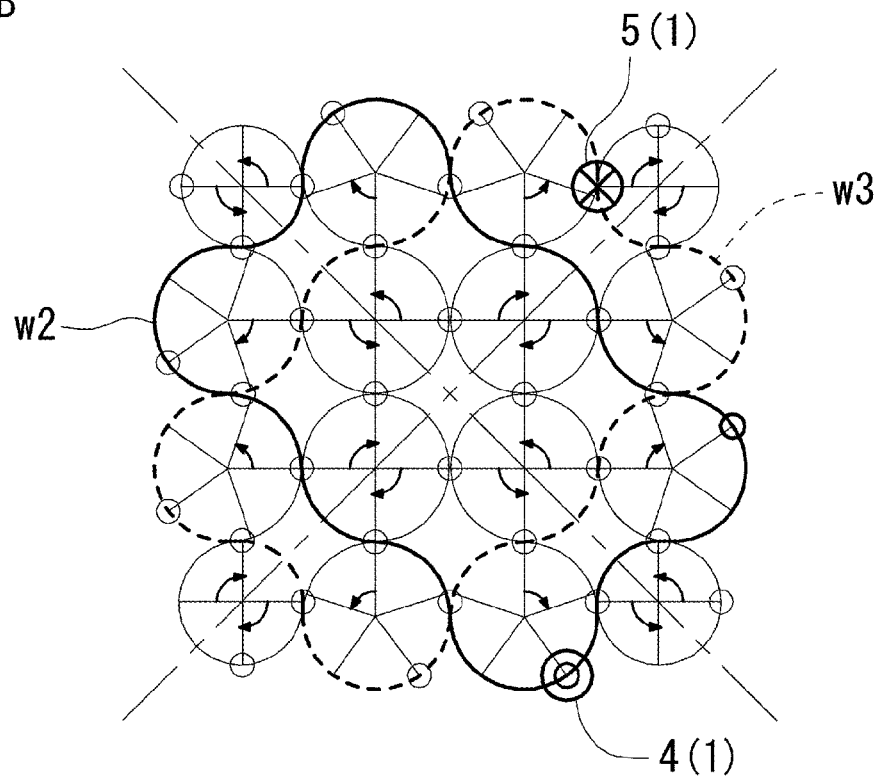

FIG. 27B indicates an eighteenth position where the second yarn bobbin 4 is moved by a distance corresponding to ⅕ rotation of the ordinary gears 12, and the third yarn bobbin 5 is moved by a distance corresponding to ¼ rotation of the corner gears 7, from the seventeenth position indicated in FIG. 27A.

Figure 28A:
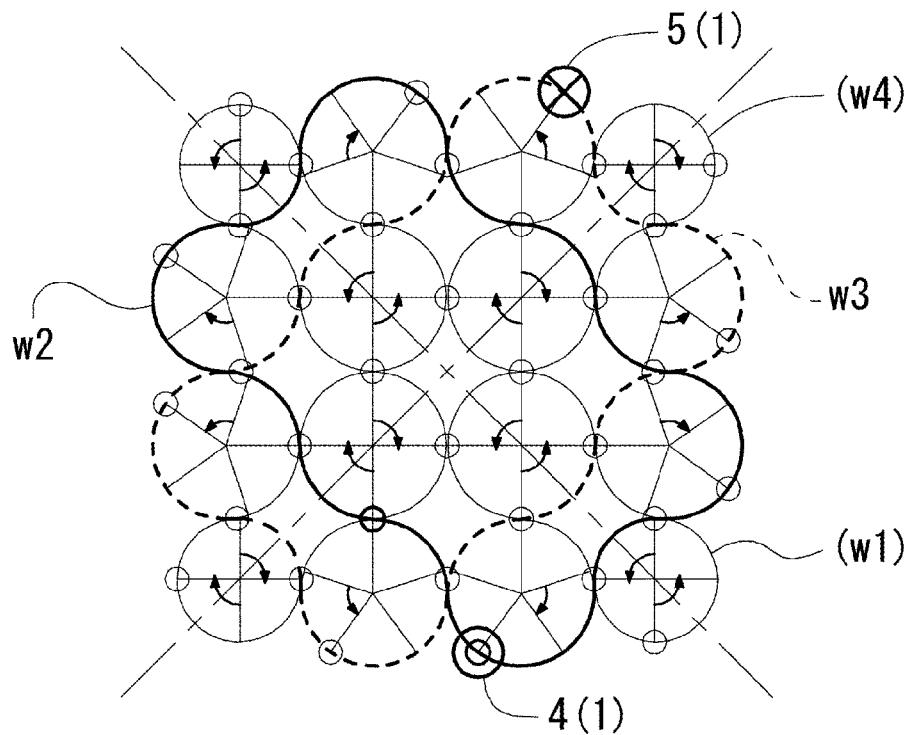
FIGS. 28A and 28B show the conditions of yarns in the fourth side surface.

FIG. 28A indicates a nineteenth position where each of the second and third yarn bobbins 4, 5 is moved by a distance corresponding to ⅕ rotation of the ordinary gears 12, from the eighteenth position indicated in FIG. 27B.

Figure 28B:
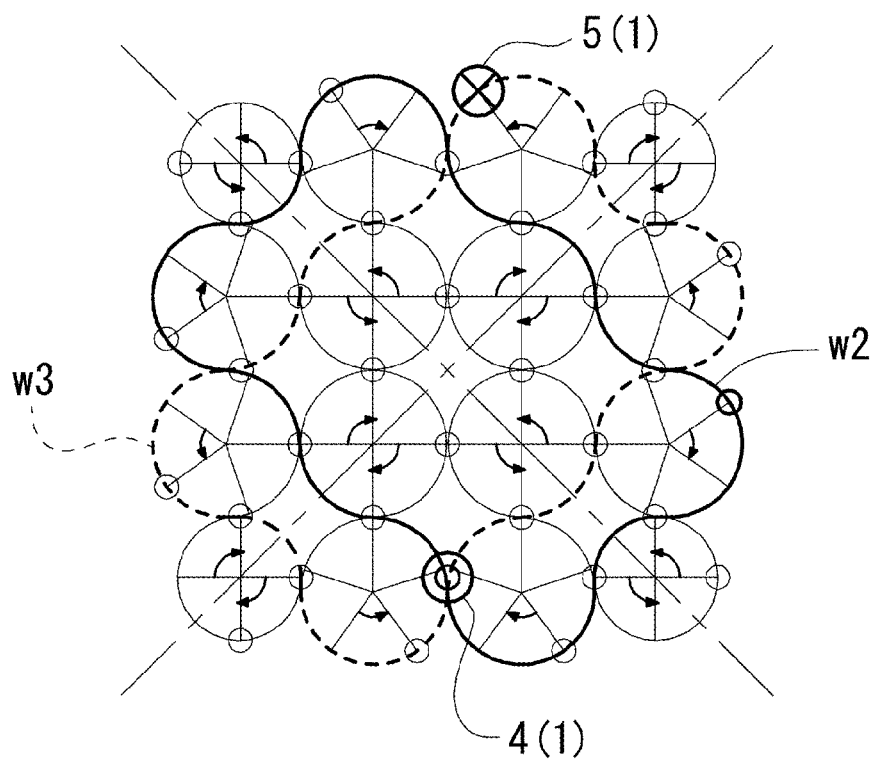

FIG. 28B indicates a twentieth position where each of the second and third yarn bobbins 4, 5 is moved by a distance corresponding to ⅕ rotation of the ordinary gears 12, from the nineteenth position indicated in FIG. 28A.

Then, each of the second and third yarn bobbins 4, 5 is moved by a distance corresponding to ⅕ rotation of the ordinary gears 12, from the twentieth position indicated in FIG. 28B, and the bobbins return to the first position indicated in FIG. 19A. The movement from the first position to the twentieth position is one cycle of the movement paths w2, w3 in the fourth side surface 2d.

As a result of the above-described study with reference to FIGS. 9A to 28B, in production of the string-like member 2, the starting positions (first positions) in the third side surface 2c and the fourth side surface 2d are set in an improved manner as indicated in FIGS. 9A and 19A. Therefore, the crossing angles α of the yarns 1 appearing on the surface of the third side surface 2c can be set to the angle c (see FIG. 3) which is larger than the angle in the prior art (90 deg.). Consequently, the exposed yarn length L can be made shorter than that in the prior art. The angle a corresponding to the crossing angles α in the first side surface 2a is equal to the angle c in the third side surface 2c (a=c).

In the second and fourth side surfaces 2b, 2d (side circumferential surfaces) which are adjacent to the third side surface 2c, the crossing angles α can be set to the angles b, d (see FIG. 3) which is smaller than the angle in the prior art (90 deg.), and therefore the exposed yarn length L can be made longer than that in the prior art.

DESCRIPTION OF REFERENCE NUMERALS

1 yarn
2 string-like member
2a to 2d first to fourth side surfaces
13 edge portion
α crossing angle of yarns

The invention claimed is:

1. A gland packing which is configured by a string-like member formed by braiding a plurality of yarns, which has a rectangular section, and in which directions of the yarns in the section are parallel to diagonal lines, and the number of movement paths of the yarns is set to 4, wherein
the yarns are braided in a state where, in crossing angles of the yarns which are exposed on four side surfaces of the string-like member, crossing angles in adjacent side surfaces of the four side surfaces are different from each other.

2. The gland packing according to claim 1, wherein the string-like member is looped so that, the crossing angle in a side surface in the four side surfaces, the side surface being to function as an inner circumferential surface, is larger than the crossing angles in side surfaces which are to function as side circumferential surfaces adjacent to the inner circumferential surface.

3. The gland packing according to claim 2, wherein, in each pair of opposed side surfaces in the four side surfaces, the crossing angles of the yarns are set to be equal to each other.

4. The gland packing according to claim 3, wherein, in edge portions formed by adjacent side surfaces of the string-like member, yarns which are continuous from one side surface of the adjacent side surfaces to another side surface are placed.

5. The gland packing according to claim 4, wherein the yarns are impregnated with a lubricant.

6. The gland packing according to claim 3, wherein the yarns are impregnated with a lubricant.

7. The gland packing according to claim 2, wherein, in edge portions formed by adjacent side surfaces of the string-like member, yarns which are continuous from one side surface of the adjacent side surfaces to another side surface are placed.

8. The gland packing according to claim 7, wherein the yarns are impregnated with a lubricant.

9. The gland packing according to claim 2, wherein the yarns are impregnated with a lubricant.

10. The gland packing according to claim 1, wherein, in each pair of opposed side surfaces in the four side surfaces, the crossing angles of the yarns are set to be equal to each other.

11. The gland packing according to claim 10, wherein, in edge portions formed by adjacent side surfaces of the string-like member, yarns which are continuous from one side surface of the adjacent side surfaces to another side surface are placed.

12. The gland packing according to claim 11 wherein the yarns are impregnated with a lubricant.

13. The gland packing according to claim 10, wherein the yarns are impregnated with a lubricant.

14. The gland packing according to claim 1, wherein, in edge portions formed by adjacent side surfaces of the string-like member, yarns which are continuous from one side surface of the adjacent side surfaces to another side surface are placed.

15. The gland packing according to claim 14, wherein the yarns are impregnated with a lubricant.

16. The gland packing according to claim 1, wherein the yarns are impregnated with a lubricant.

* * * * *